United States Patent
Patrick et al.

(10) Patent No.: US 12,138,960 B1
(45) Date of Patent: Nov. 12, 2024

(54) CASTER ASSEMBLY HAVING SINUSOIDAL WHEELS

(71) Applicant: Shark Wheel, Inc., Mission Viejo, CA (US)

(72) Inventors: David Michael Patrick, Ladera Ranch, CA (US); Robert S. Patrick, Plano, TX (US)

( * ) Notice: Subject to any disclaimer, the term of this patent is extended or adjusted under 35 U.S.C. 154(b) by 0 days.

(21) Appl. No.: 18/508,108

(22) Filed: Nov. 13, 2023

(51) Int. Cl.
B60B 33/00 (2006.01)

(52) U.S. Cl.
CPC ...... B60B 33/0042 (2013.01); B60B 33/0021 (2013.01); B60B 33/0068 (2013.01); B60B 33/0081 (2013.01)

(58) Field of Classification Search
CPC ............ B60B 33/0039; B60B 33/0018; B60B 33/0042; B60B 33/0021; B60B 33/006; B60B 33/0065; B60B 33/0068; B60B 33/0076; B60B 33/0081
See application file for complete search history.

(56) References Cited

U.S. PATENT DOCUMENTS

| | | | | |
|---|---|---|---|---|
| 740,035 | A * | 9/1903 | Nichols et al. | B60B 15/026 301/41.1 |
| 2,685,351 | A * | 8/1954 | Kramcsak, Jr. | B60B 33/021 188/74 |
| 2,976,562 | A * | 3/1961 | Black | B60B 33/0002 16/21 |
| 4,550,808 | A * | 11/1985 | Folson | B60B 33/0042 188/74 |
| 4,669,580 | A * | 6/1987 | Neville | B60B 33/0042 188/69 |
| 5,214,823 | A * | 6/1993 | Screen | B60B 33/0002 16/35 R |

(Continued)

FOREIGN PATENT DOCUMENTS

| | | | |
|---|---|---|---|
| CN | 210617742 U | * | 5/2020 |
| EP | 0370716 A1 | * | 5/1990 |

(Continued)

OTHER PUBLICATIONS

SkyValet Luggage: Smart Luggage with Shark Wheels, Indiegogo, Jan. 2019, https://www.indiegogo.com/projects/skyvalet-luggage-smart-luggage-with-shark-wheels#/.

*Primary Examiner* — Chuck Y Mah
(74) *Attorney, Agent, or Firm* — CIONCA IP Law P.C.

(57) ABSTRACT

A caster assembly having a top cap configured to engage with a structure, a caster leg configured to pivotally engage with the top cap, such that the caster leg selectively pivots about a pivot axis, and a pair of sinusoidal wheels configured to be rotationally engaged with the caster leg, the sinusoidal wheels being configured to rotate about a wheel rotational axis and swivel with the caster leg as a required when the structure is moved. An angled member of the caster leg may be configured to engage with the sinusoidal wheels such that the wheel rotational axis is not intersected by the pivot axis. An offset angle formed between the angled member and a vertical member of the caster leg, when used in conjunction with the disclosed sinusoidal wheels, is configured to ease structure movement by minimizing resistances exerted on the sinusoidal wheels during rolling and caster leg pivoting.

7 Claims, 17 Drawing Sheets

(56) References Cited

U.S. PATENT DOCUMENTS

| | | | | |
|---|---|---|---|---|
| 5,390,393 | A * | 2/1995 | Reppert | B60B 33/0002 16/21 |
| 5,664,645 | A * | 9/1997 | Rodriguez | B60B 33/025 188/19 |
| 6,725,501 | B2 * | 4/2004 | Harris | B60B 33/0073 16/31 R |
| 6,854,567 | B2 * | 2/2005 | Suzuki | B60B 33/0021 188/1.11 R |
| 7,926,145 | B2 * | 4/2011 | Liao | B60B 33/0049 188/19 |
| 7,950,108 | B2 * | 5/2011 | Yang | B60B 33/0049 16/35 R |
| 8,020,679 | B2 * | 9/2011 | Wu | A45C 5/143 16/21 |
| 9,027,204 | B2 * | 5/2015 | Frame | B60B 33/0044 16/35 R |
| 10,118,439 | B1 * | 11/2018 | Patrick | B60B 21/02 |
| D889,128 | S | 7/2020 | Patrick et al. | |
| 2005/0144755 | A1 * | 7/2005 | Miyoshi | B60B 33/0018 16/35 R |
| 2007/0151645 | A1 * | 7/2007 | Mathews | B60C 11/047 152/900 |
| 2009/0038113 | A1 * | 2/2009 | Yan | B60B 33/0021 16/39 |
| 2010/0170061 | A1 * | 7/2010 | Lin | B60B 33/0049 16/35 R |
| 2014/0250628 | A1 * | 9/2014 | Tsai | B60B 33/0007 16/47 |
| 2014/0283335 | A1 * | 9/2014 | Meersschaert | B60B 33/006 16/46 |
| 2015/0298501 | A1 * | 10/2015 | Engel | B60B 1/00 301/95.101 |
| 2020/0047552 | A1 * | 2/2020 | Fawcett | B60B 33/021 |
| 2020/0070570 | A1 * | 3/2020 | Patrick | B60B 15/026 |

FOREIGN PATENT DOCUMENTS

| | | |
|---|---|---|
| JP | 3225345 U | 2/2020 |
| JP | 1657505 | 4/2020 |

\* cited by examiner

CASTER ASSEMBLY HAVING SINUSOIDAL WHEELS

BACKGROUND OF INVENTION

1. Field of the Invention

The invention relates generally to casters and specifically to caster assemblies having sinusoidal wheels.

2. Description of the Related Art

Casters and similar wheel based technologies are often placed on the bottoms of supported structures, such as tables, workbenches, etc. in order to allow a user to selectively move the supported structures around via rolling, while reducing the amount of strain and effort required to do so. Conventional casters may utilize common cylindrical wheels to facilitate the rolling of said supported structure, however, such technologies may have several notable limitations. For example, standard, cylindrical wheels may exhibit a notable resistance to being rolled, particularly if a significant amount of weight is being applied on them by the supported structure. Additionally, the flat profile of a standard cylindrical wheel may result in a significant amount of frictional resistance being exerted on said wheel while being swiveled, thus increasing wheel wear and the force required to swivel the caster to change the travel direction of the supported structure.

Therefore, there is a need to solve the problems described above by proving a device and method for a caster assembly configured to reduce the amount of resistance experienced while rolling and swiveling its wheels through the utilization of sinusoidally shaped wheels disposed at an offset angle.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a caster assembly is provided, the caster assembly comprising: a pivot hub configured to be engaged with a supported structure, the pivot hub comprising: a pivot shaft configured to be engaged with the supported structure; and a plurality of ball bearings configured to be engaged with the pivot shaft; a caster leg configured to be engaged with the pivot hub, such that the caster leg is pivotally engaged with the supported structure and configured to pivot about a pivot axis, the caster leg having: a vertical member configured to be coaxially aligned with the pivot axis; a caster leg cavity nested within the vertical member, wherein each ball bearing of the plurality of ball bearings is configured to be nested within the caster leg cavity; and an angled member associated with the vertical member, the angled member being coaxially aligned with an offset axis, wherein the angled member engages with the vertical member such that an offset angle is formed between the pivot axis and the offset axis; a top cap associated with the caster leg, wherein the top cap is configured to cover the caster leg cavity; a pair of sinusoidal wheels configured to be rotationally engaged with the angled member of the caster leg, such that each sinusoidal wheel of the pair of sinusoidal wheels is configured to rotate independently about a wheel rotational axis, each sinusoidal wheel of the pair of sinusoidal wheels having: a wheel hub configured to be rotationally engaged with the angled member of the caster leg; and a rim configured to surround and be engaged with the wheel hub, the rim having: a pair of lateral edges; and a rim center engaged with and equidistantly disposed between the pair of lateral edges, wherein the rim center of each sinusoidal wheel of the pair of sinusoidal wheels follows a sinusoidal pattern around a circumference of the sinusoidal wheel, the sinusoidal pattern having a sinusoidal amplitude and sinusoidal frequency, wherein the rim center of each sinusoidal wheel of the pair of sinusoidal wheels is configured to be coaxially aligned with the wheel rotational axis. Thus, an advantage is that the amount of resistance experienced when rolling the sinusoidal wheels of the caster assembly is reduced, compared to the amount of resistance experienced when rolling a comparable caster assembly having standard, cylindrical wheels. Another advantage is that the resistance experienced while swiveling the caster assembly having sinusoidal wheels is less than when the resistance experienced while swiveling the caster having standard, cylindrical wheels, for wheels with rims having equivalent surface area. Another advantage is that each sinusoidal wheel of the pair of sinusoidal wheels may be configured to rotate independently of the other sinusoidal wheel, such that the caster assembly may be configured to perform tight pivots within a small area, thus aiding the maneuverability of the supported object. Another advantage is that the caster assembly may be configured to utilize a heavy load pivot hub to allow the caster leg to remain easily pivotable about the supported structure, even for heavier supported structures.

In another aspect a caster assembly is provided, the caster assembly comprising: a pivot hub configured to be engaged with a supported structure; a caster leg configured to be engaged with the pivot hub, such that the caster leg is pivotally engaged with the supported structure and configured to pivot about a pivot axis, the caster leg having: a vertical member configured to be coaxially aligned with the pivot axis; and an angled member associated with the vertical member, the angled member being coaxially aligned with an offset axis, wherein the angled member engages with the vertical member such that an offset angle is formed between the pivot axis and the offset axis; a pair of sinusoidal wheels configured to be rotationally engaged with the angled member of the caster leg, such that each sinusoidal wheel of the pair of sinusoidal wheels is configured to rotate about a wheel rotational axis, each sinusoidal wheel of the pair of sinusoidal wheels having: a rim configured to be pivotally engaged with the angled member of the caster leg, the rim having: a pair of lateral edges; and a rim center engaged with and equidistantly disposed between the pair of lateral edges, wherein the rim center of each sinusoidal wheel of the pair of sinusoidal wheels follows a sinusoidal pattern around a circumference of the sinusoidal wheel, the sinusoidal pattern having a sinusoidal amplitude and sinusoidal frequency, wherein the rim center of each sinusoidal wheel of the pair of sinusoidal wheels is configured to be coaxially aligned with the wheel rotational axis. Again, an advantage is that the amount of resistance experienced when rolling the sinusoidal wheels of the caster assembly is reduced, compared to the amount of resistance experienced when rolling a comparable caster assembly having standard, cylindrical wheels. Another advantage is that the resistance experienced while swiveling the caster assembly having sinusoidal wheels is less than when the resistance experienced while swiveling the caster having standard, cylindrical wheels, for wheels with rims having equivalent surface area. Another advantage is that each sinusoidal wheel of the pair of sinusoidal wheels may be configured to rotate independently of the other sinusoidal wheel, such that the caster assembly may be configured to perform tight pivots within a small area, thus aiding the maneuverability of the supported object. Another advantage is that the caster assembly may be configured to utilize a heavy load pivot hub to allow the caster leg to remain easily pivotable about the supported structure, even for heavier supported structures.

In another aspect, a caster assembly is provided, the caster assembly comprising: a caster leg configured to be pivotally engaged with a supported structure, wherein the caster leg is configured to pivot about a pivot axis, the caster leg having: a vertical member configured to be coaxially aligned with the pivot axis; and an angled member associated with the vertical member, the angled member being coaxially aligned with an offset axis, wherein the angled member engages with the vertical member such that an offset angle is formed between the pivot axis and the offset axis; at least one sinusoidal wheel configured to be rotationally engaged with the angled member of the caster leg, such that the at least one sinusoidal wheel is configured to rotate about a wheel rotational axis, wherein a rim of the at least on sinusoidal wheel follows a sinusoidal pattern around a circumference of the sinusoidal wheel, the sinusoidal pattern having a sinusoidal amplitude and sinusoidal frequency. Again, an advantage is that the amount of resistance experienced when rolling the sinusoidal wheels of the caster assembly is reduced, compared to the amount of resistance experienced when rolling a comparable caster assembly having standard, cylindrical wheels. Another advantage is that the resistance experienced while swiveling the caster assembly having sinusoidal wheels is less than when the resistance experienced while swiveling the caster having standard, cylindrical wheels, for wheels with rims having equivalent surface area. Another advantage is that each sinusoidal wheel of the pair of sinusoidal wheels may be configured to rotate independently of the other sinusoidal wheel, such that the caster assembly may be configured to perform tight pivots within a small area, thus aiding the maneuverability of the supported object. Another advantage is that the caster assembly may be configured to utilize a heavy load pivot hub to allow the caster leg to remain easily pivotable about the supported structure, even for heavier supported structures.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
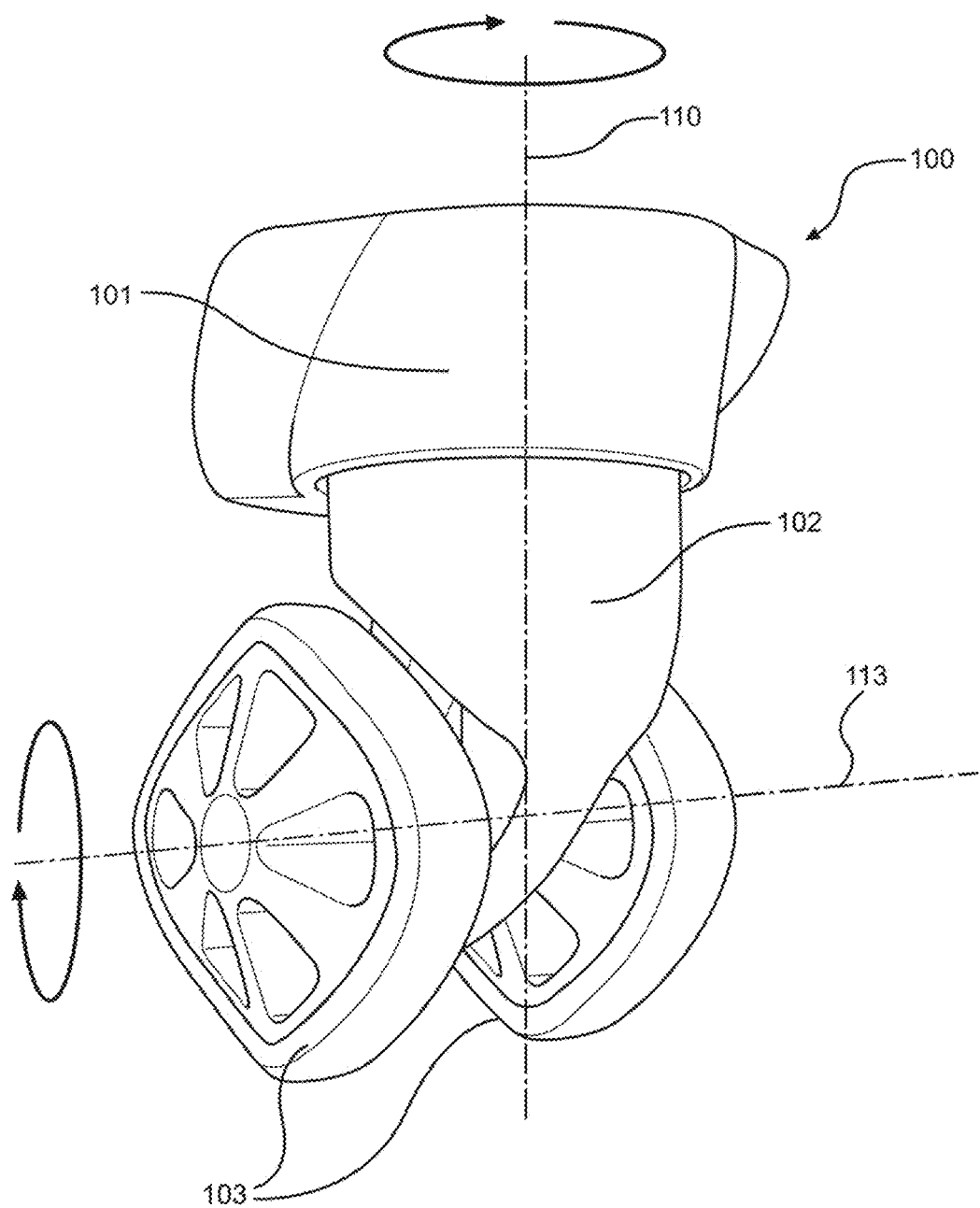
FIG. 1 illustrates the front perspective view of a caster assembly having sinusoidal wheels, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 102 and 202, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates the front perspective view of a caster assembly ("caster") 100 having sinusoidal wheels 103, according to an aspect. The herein disclosed caster assembly 100 of FIG. 1 may be configured to utilize a pair of sinusoidal wheels 103 in conjunction with specially arranged caster elements in order to facilitate easy rolling of a supported structure and selective swiveling of each caster assembly 100 as the structure travels in different directions. The caster assembly 100 may comprise a top cap 101, a caster leg 102, a pivot pin, such as pivot pin 304 of FIG. 3, configured to pivotally engage the top cap 101 with the caster leg 102, a pair of sinusoidal wheels 103, a wheel axle, such as wheel axle 305 of FIG. 3, configured to rotationally engage the pair of sinusoidal wheels 103 with the caster leg 102 and an axle washer, such as axle washer 306 of FIG. 3, configured to engage with the wheel axle. The engagements between each element of the caster assembly 100 will be discussed in greater detail hereinbelow.

In an embodiment, the caster leg 102 may be configured to pivotally engage with the top cap 101, such that the caster leg 102 may pivot freely about a pivot axis 110 while the top cap 101 may be irrotationally secured to a supported structure, such as a workbench or cart. Furthermore, in said embodiment, the sinusoidal wheels 103 may be configured rotate about a wheel rotational axis 113, wherein the wheel rotational axis 113 may be perpendicular to the pivot axis 110. While pivot axis 110 and the wheel rotational axis 113 may be perpendicular to each other, they may not occupy the same plane nor intersect each other, due to an offset angle of the caster leg 102, such as offset angle 212 of FIG. 2C, which will be discussed hereinbelow. This particular configuration of the caster assembly 100 having a pair of sinusoidal wheels 103 disposed at an offset angle from the pivot axis 110 may experience reduced resistance when rolling of the sinusoidal wheels 103, when compared to a caster assembly lacking the offset angle and using standard cylindrical, thus allowing for structures or objects placed on top of these caster assemblies 100 to be rolled without requiring as much force to move it as a caster assembly lacking the sinusoidal wheels and the offset wheel rotational axis 113. In an embodiment, the herein disclosed caster assembly 100 may experience 57% less rolling resistance when compared to a conventional caster assembly utilizing wheels having a right circular cylinder shape and lacking an offset angle, wherein said conventional caster assembly otherwise has the equivalent specifications (same contact patch surface area for the wheels, same material, etc. As a result of the shape of the sinusoidal wheels, said sinusoidal wheels 103 may be able to, in certain situations, begin rolling after pivoting/rotating fewer degrees, when compared to conventional right circular cylindrical wheels, thus reducing the force required to pivot said sinusoidal wheels to a rollable orientation, as will be disclosed in greater detail hereinbelow.

In an embodiment, a table (not shown) having four legs may have one of the herein disclosed caster assemblies 100 attached to the bottom of each leg, for a total of four caster assemblies 100. As the table is selectively pushed in a direction by a user, each caster assembly 100 may quickly pivot accordingly such that the sinusoidal wheels roll smoothly as the table is moved. If the user changes the movement direction of the table (e.g., changing a movement direction from left to right, for example), the caster leg 102 of each caster assembly 100 may selectively pivot about the pivot axis 110 accordingly, in order to orient the sinusoidal wheels 103 such that their wheel rotational axis 113 is perpendicular to the direction of travel, wherein said orientation allows the sinusoidal wheels 103 to roll with the least amount of resistance. Furthermore, an offset angle, such as offset angle 212 of FIG. 2C, may be formed between the portion of the caster leg 102 attached to the sinusoidal wheels 103 and the portion of the caster leg 102 pivotally engaged with the top cap 101 on the pivot axis 110. Said offset angle, as well as the utilization of sinusoidal shaped wheels 103, may ensure optimized caster performance (e.g. minimized resistance to rolling the sinusoidal wheels 103, minimized resistance to pivoting the caster leg 102 and the attached sinusoidal wheels 103) while moving a supported structure.

Figure 2A:
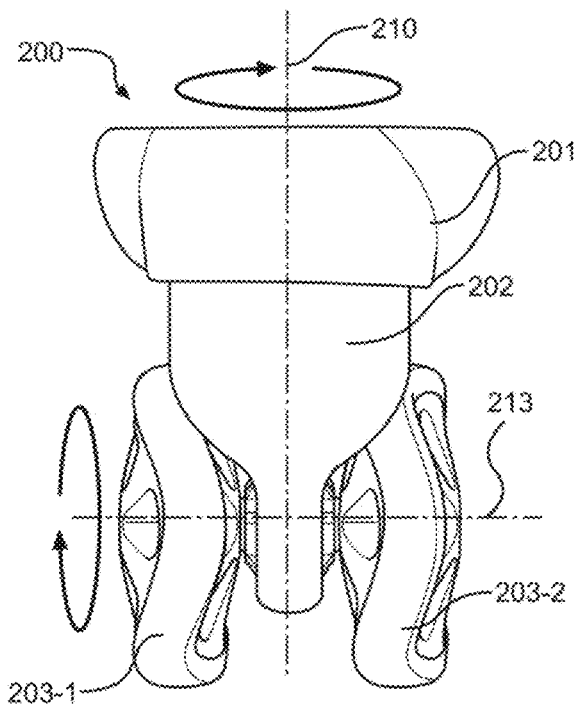
FIGS. 2A-2F illustrate the front elevation, rear elevation, left side elevation, right side elevation, top plan and bottom plan views, respectively, of a caster assembly having sinusoidal wheels, according to an aspect.
Figure 2B:
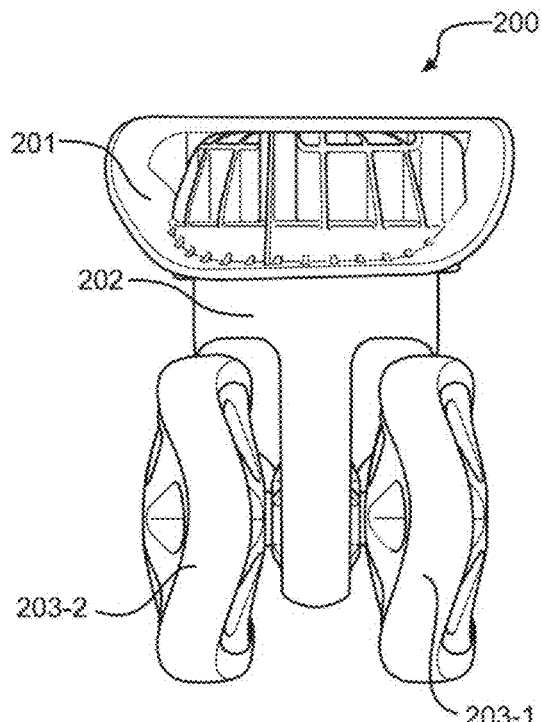
Figure 2C:
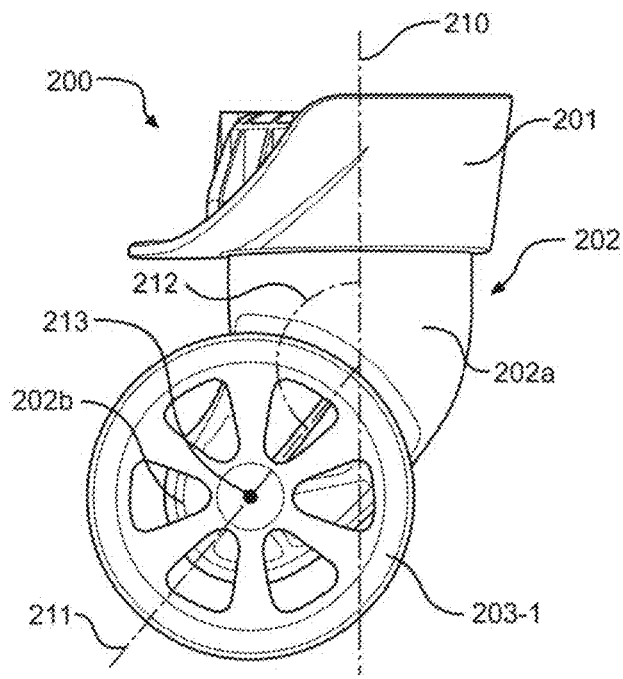
Figure 2D:
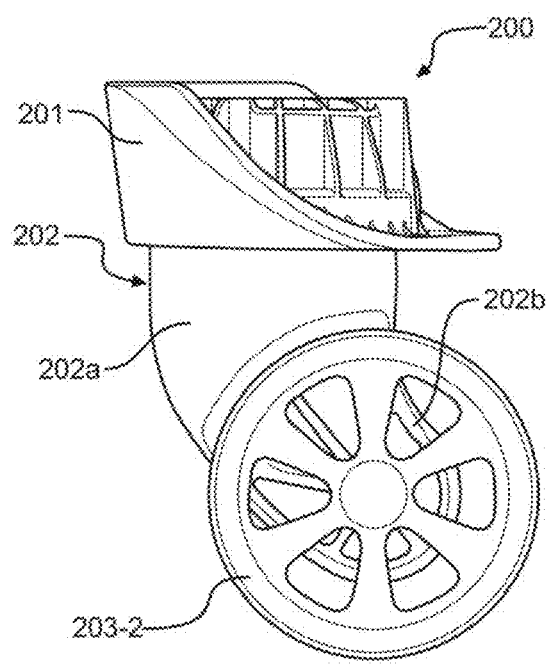
Figure 2E:
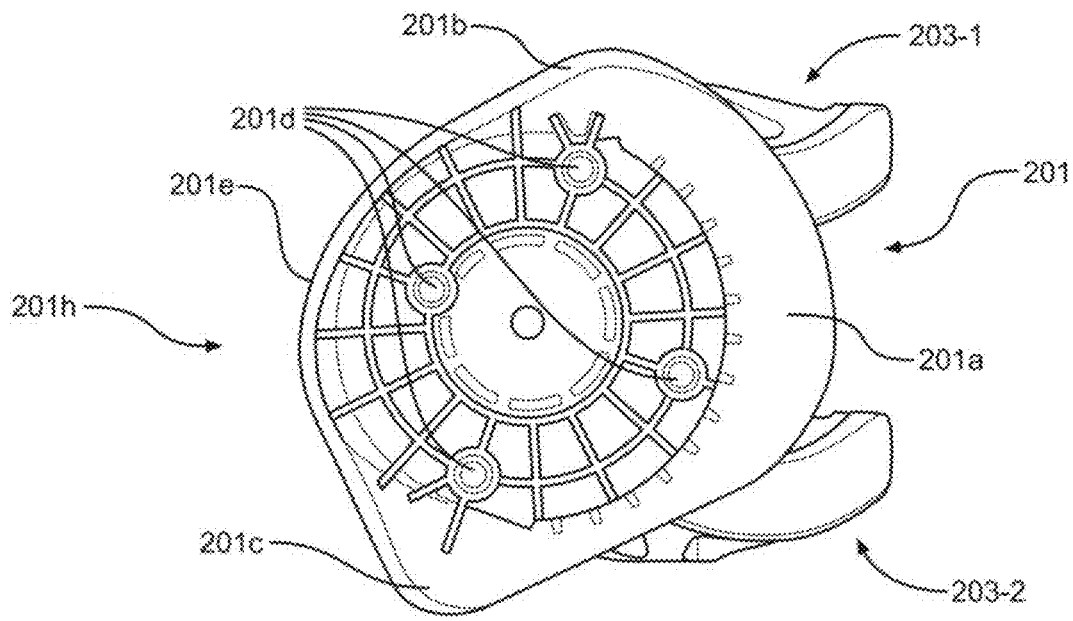

FIGS. 2A-2F illustrate the front elevation, rear elevation, left side elevation, right side elevation, top plan and bottom plan views, respectively, of a caster assembly 200 having sinusoidal wheels 203-1, 203-2, according to an aspect. As disclosed hereinabove, the top cap 201 of a caster assembly 200 may be configured to engage directly with a portion of a supported structure (not shown), while also being pivotally engaged with the caster leg 202, such that the attached sinusoidal wheels 203-1, 203-2 are pivotally engaged with the supported structure. From the front elevation view of FIG. 2A, the pivot axis 210 and wheel rotational axis 213 may be shown as being perpendicular to each other (e.g., forming a 90 degree angle between each other, from the viewed perspective), but not intersecting (not occupying a shared plane). As can be seen in FIG. 2C, while a vertical member 202a of the caster leg 202 may be coaxially aligned with the pivot axis 210, an angled member 202b of the caster leg 202 may be bent at an offset angle 212 to the pivot axis 210, such that the angled member 202b of the caster leg 202 is coaxially aligned with an offset axis 211. As such, an offset angle 212 may be formed between pivot axis 210 and the offset axis 211. This offset angle 212 may help to maintain the pivoting function of the caster leg 202 and rotating function of the sinusoidal wheels 203-1, 203-2, even when supporting greater weights.

The top cap 201 may include several features that allow it to facilitate a secure engagement between the supported structure and the caster leg 202, wherein the caster leg 202 is pivotally engaged with the supported structure. The top cap 201 may comprise a cap body 201a having a first raised edge 201b and a second raised edge 201c, wherein the first raised edge 201b and a second raised edge 201c form a continuous raised rim 201e around a front end 201h of the cap body 201a. In an embodiment, the top cap 201 may be symmetrical, while in an alternative embodiment, the top cap 201 may be asymmetrical. The disclosed caster assembly embodiment 200 of FIG. 2A-2F may be configured to engage with a suitcase, such as suitcase 1319 of FIG. 13, wherein the top cap 201 is configured to securely engage with the bottom corner of a suitcase to enable enhanced maneuverability of said suitcase. The top cap 201 may have any suitable shape, as long as said top cap 201 facilitates secure, pivotal engagement between the supported structure and the caster leg 202. In an embodiment, a plurality of fastening pockets 201d may be nested within the cap body 201a, wherein each fastening pocket 201d may be configured to aid engagement of the caster assembly 200 with the supported structure, such as the suitcase 1319 of FIG. 13. It should be understood that the shape and structure of the top cap 201 may be configured to facilitate secure engagement between the top cap 201 and a supported structure.

The disclosed caster assembly 200 embodiment of FIGS. 2A-2F may utilize two sinusoidally shaped wheels 203-1, 203-2 to facilitate rolling of the caster; a first sinusoidal wheel 203-1 and a second sinusoidal wheel 203-2. It should be understood that other quantities of wheels may also be utilized within the disclosed caster assembly while remaining within the scope of the application. As will be discussed in greater detail hereinbelow, the "sinusoidal" aspect of the sinusoidally shaped wheels 203-1, 203-2 may relate to the shape of their rims, such as rim 403b, of FIG. 4B.

Figure 2F:
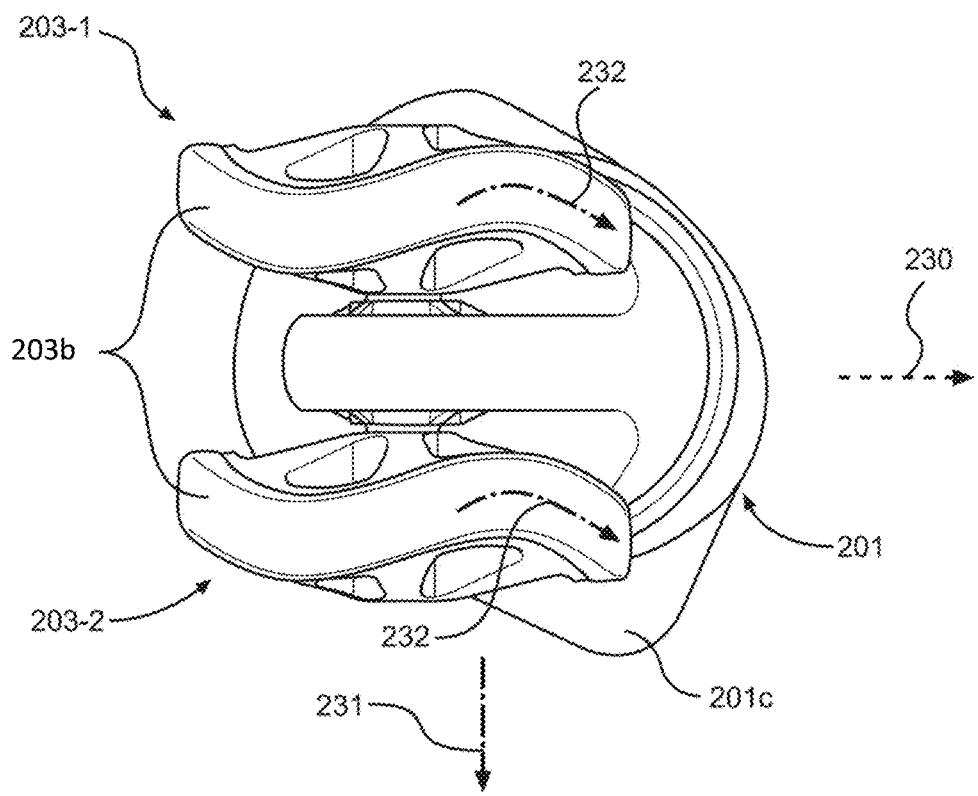

As can be seen in FIG. 2F, the particular shape of the sinusoidal wheels 203-1, 203-2 may be configured to allow for easy directional changes of the caster leg 202, and thus directional changes of the supported object, under certain conditions. In an embodiment, a caster leg 202 is facing in a current travel direction 230. In said embodiment, the user wishes to move the supported object in an intended travel direction 231. As a result of the sinusoidal wheels 203-1, 203-2 having a sinusoidally shaped rim 203b, the rim 203b of each sinusoidal wheel 203-1, 203-2 may "wave" or "reciprocate" back and forth around the circumference/outer perimeter of the corresponding sinusoidal wheel 203-1, 203-2, thus resulting in the rim 203b of each sinusoidal wheel "bending" 232 toward or away from the intended travel direction 231.

If the sinusoidal wheels 203-1, 203-2 are both "bending" 232 toward an intended travel direction 231, while the user is attempting to move the supported object in said intended travel direction 231, then the amount of scrubbing (e.g. frictional resistance) that the sinusoidal wheels 203-1, 203-2 will experience before being able to roll in the intended travel direction 231 may be reduced, in comparison to the same scenario using conventional, right circular cylindrical wheels. In contrast, in embodiments wherein the sinusoidal wheels 203-1, 203-2 are not already "bending" 232 in the intended travel direction 231, scrubbing of the sinusoidal wheels 203-1, 203-2 may still occur, but the amount of force required to scrub/pivot the sinusoidal wheels 203-1, 203-2 until they may roll in an intended travel direction 231 may be no greater than what would be required to do the same for standard cylindrical wheels.

Figure 3:
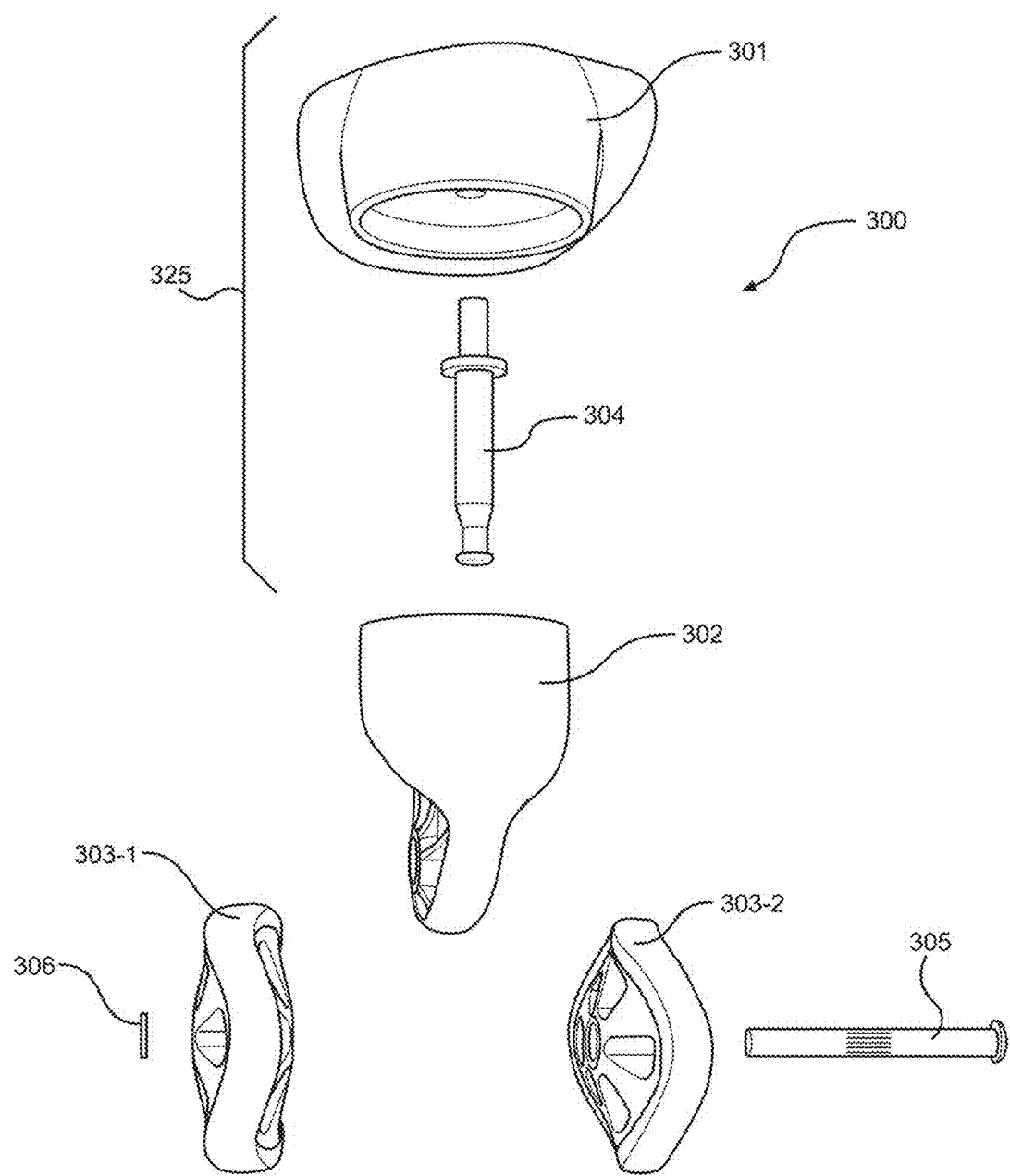
FIG. 3 illustrates the exploded, front perspective view of a caster assembly having sinusoidal wheels, according to an aspect.

FIG. 3 illustrates the exploded, front perspective view of a caster assembly 300 having sinusoidal wheels 303-1, 303-2, according to an aspect. As disclosed hereinabove, the caster assembly 300 may comprise a top cap 301, a caster leg 302, a pivot pin 304 configured to pivotally engage the top cap 301 with the caster leg 302, a first sinusoidal wheel 303-1, a second sinusoidal wheel 303-2, a wheel axle 305 configured to rotationally engage the first sinusoidal wheel 303-1 and the second sinusoidal wheel 303-2 with the caster leg 302, and an axle washer 306 configured to engage with the wheel axle 305 to maintain the rotational engagement between first and second sinusoidal wheels 303-1, 303-2 and the caster leg 302. Each component of the caster assembly 300 and their various sub-components will be described in greater detail hereinbelow. While not visible in FIG. 3, it should be understood that each sinusoidal wheel 303-1, 303-2 and the caster leg 302 may each have a corresponding port, such as wheel axle port 403c of FIG. 4C, for the wheel axle 305 to be nested within them (e.g. slotted through) to facilitate the rotational engagement/interconnection between said elements, and thus the rotation of the sinusoidal wheels 303-1, 303-2 relative to the caster leg 302 and resultant rolling of the caster assembly 300. It should be understood that the term "pivotal" may be used in describing the pivoting of caster leg 302 about the pivot axis, such as pivot axis 110 of FIG. 1, whereas the term "rotational" may be used in describing the rotating of the sinusoidal wheels 303-1, 303-2 about the wheel rotational axis, such as wheel rotational axis 113 of FIG. 1.

It should be noted that the sinusoidal wheels 303-1, 303-2 may be configured to rotate independently of each other. In an example, a first sinusoidal wheel 303-1 may be rotated clockwise, while the second sinusoidal 303-2 wheel may be rotated counterclockwise. In said example, the independent rotation of each sinusoidal wheel 303-1, 303-2 in an opposite direction may be configured to pivot the attached caster assembly 300 in a tight radius, thus allowing the caster assembly to change directions rapidly within a small area.

While the caster leg 302 may be configured to be pivoted about its engagement with a supported structure, it should be understood that various different arrangements may be utilized in order to facilitate this pivoting of the caster leg 302 about a supported object. As seen in FIG. 3, the caster leg 302 may be pivotally engaged with the top cap 301 by the pivot pin 304, wherein the top cap 301 may be irrotationally engaged with a supported structure. In contrast, alternative embodiments of the caster assembly, such as caster assembly 1000 of FIG. 10, may omit the top cap entirely, wherein the caster assembly may be pivotally engaged with the supported structure by a corresponding pivot pin. It should be understood that any suitable element(s) may be disposed between the caster leg 302 and the supported structure to facilitate pivoting of the caster leg 302 and thus the attached sinusoidal wheels 303-1, 303-2. As such, the element or collection of elements configured to engage with the supported structure with the caster leg 302 to facilitate pivoting of the caster leg 302 about the pivot axis, such as pivot axis 210 of FIG. 2A, may be referred to as a pivot hub 325. In the caster assembly 300 embodiment of FIG. 3, the pivot hub 325 comprises a top cap and a pivot pin 304.

Figure 4A:
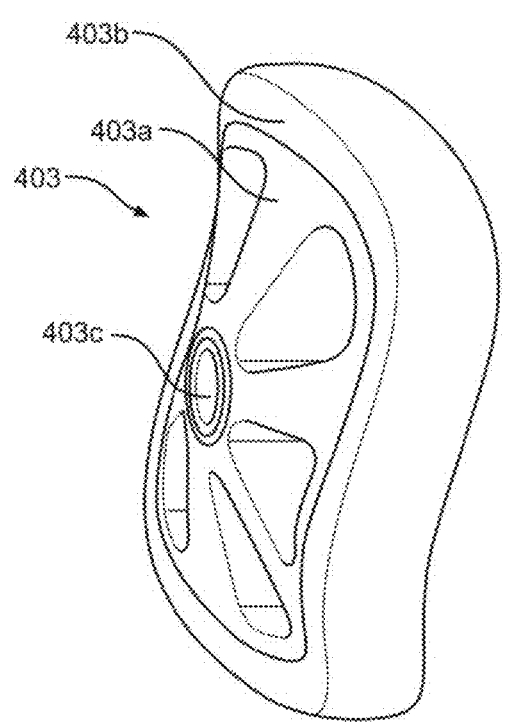
FIGS. 4A-4C illustrate the front perspective, front elevation and side elevation views, respectively of a sinusoidal wheel, according to an aspect.
Figure 4B:
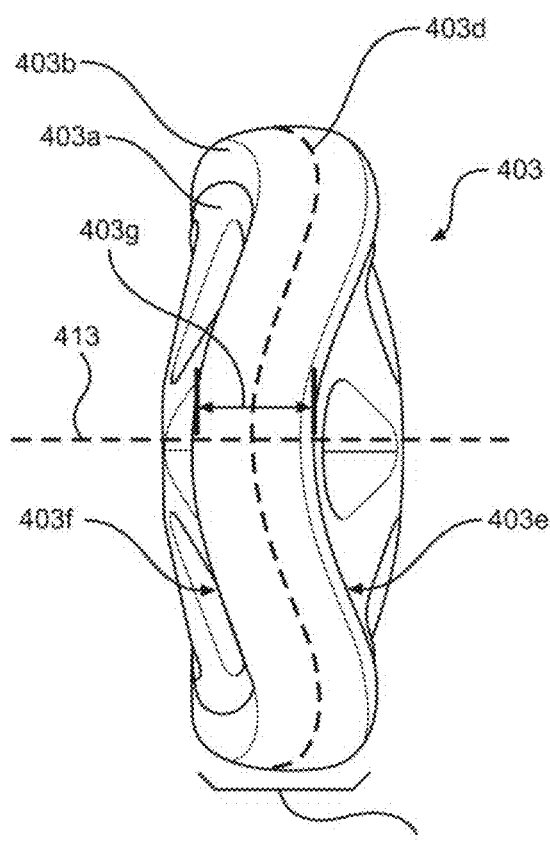
Figure 4C:
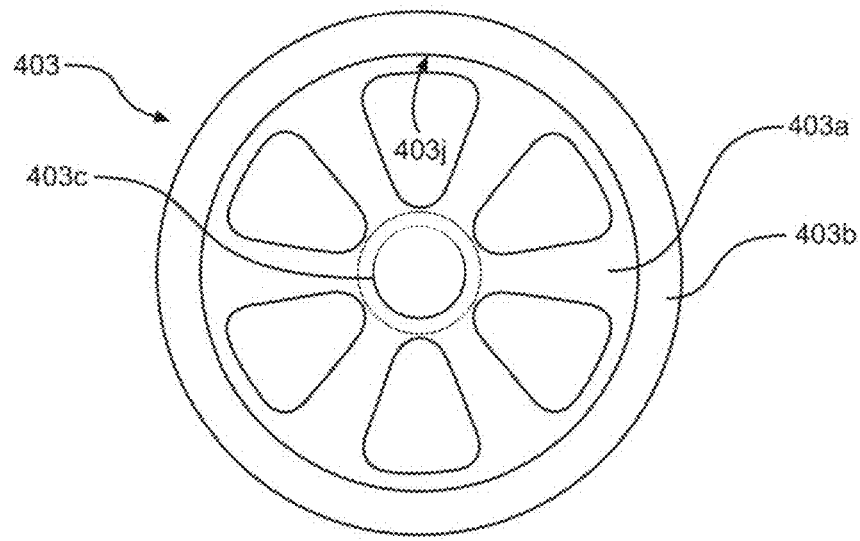

FIGS. 4A-4C illustrate the front perspective, front elevation and side elevation views, respectively of a sinusoidal wheel 403, according to an aspect. The sinusoidal wheel 403 described herein should be understood to correspond to the first sinusoidal wheel 303-1 or second sinusoidal wheel 303-2 of FIG. 3, wherein both sinusoidal wheels have the same structure. The sinusoidal wheel 403 may comprise a rim 403b and a wheel hub 403a engaged with and surrounded by the rim 403b, as seen in FIG. 4A-4C. It should be understood that a corresponding wheel axle port 403c may be nested within the center of the wheel hub 403a to facilitate rotational engagement of the sinusoidal wheel 403 with the aforementioned wheel axle, such as wheel axle 305 of FIG. 3.

As seen in FIG. 4B, the rim 403b may have a consistent width 403g around the perimeter 403j of the wheel hub 403a. The rim 403b may be configured to contact the ground directly as the sinusoidal wheel 403 rotates, wherein the rim 403b has a rim center 403d disposed between and engaged with a pair of lateral edges ("edges") 403e, 403f. The rim center 403d may remain equally offset between the first lateral edge 403e and the second lateral edge 403f, such that the axial distance between the rim center 403d and the first lateral edge 403e and the axial distance between the rim center 403d and the second lateral edge 403f are equivalent around the perimeter of the rim (e.g., for any corresponding angle of the sinusoidal wheel 403). Furthermore, the outer diameter of the wheel rim 403b (as measured from the rotational axis 413) may decrease as it approaches each lateral edge 403e, 403f of the rim 403b from the rim center 403d, thus resulting in the rims 403b (and thus the sinusoidal wheels 403) having a rounded profile, and thus a smaller contact surface 403k that touches the ground, as seen in FIG. 4B, making the sinusoidal wheel 403 easier to pivot. In contrast, a sinusoidal wheel having a flat profile, and thus a larger contact surface 403k, would have a wheel rim with a uniform outer diameter.

It should be understood that the "profile" of the sinusoidal wheel 403 is referring to the general shape of the wheel rim surface that contacts (or is otherwise adjacent to) the ground, as viewed from in front of or behind the wheel 403, as seen in FIG. 4B, wherein the profile of the wheel influences the width (and thus the area) of the contact surface ("contact patch") 403k that directly contacts the ground while rolling. In an embodiment, a sinusoidal rim 403b/sinusoidal wheel 403 with a more rounded profile may have a contact surface 403k with a smaller area, as will be discussed hereinbelow.

It should be understood that the profile of a sinusoidal wheel 403 may be adjusted, depending on the desired properties of the sinusoidal wheel 403. In an embodiment, the profile of the sinusoidal wheel 403 may be more rounded, such that the wheel rim 403b has a smaller area contact surface 403k that directly touches the ground. In said rounded profile embodiment, the lesser area of the contact surface 403k may result in a greater PSI (pounds per square inch) being exerted upon the ground, but easier swiveling due to the reduced frictional resistance. In an alternative embodiment, a profile of a sinusoidal wheel 403 may be flatter, such that the wheel rim 403b has a larger contact surface 403k that directly touches the ground. In said flat profile embodiment, the greater area of the contact surface 403k may result in a lesser PSI being exerted upon the ground, but more difficult swiveling, due to the increased frictional resistance between the wheel rim 403b and the floor. As such, in an embodiment, a caster assembly configured to minimize rolling resistance may utilize sinusoidal wheels with a more rounded profile.

It should be understood that the "axial distances" described herein refer to the distance between corresponding elements as measured in the direction of/along the wheel rotational axis 413, as seen by the width 403g of the rim 403b. In an embodiment, the lateral edges 403e, 403f of the rim 403b may be mutually laterally offset to maintain the consistent width 403g of the rim 403b. In other words, a separation distance between the pair of lateral edges 403e, 403f of each rim may be configured to be consistent around a circumference of the corresponding rim 403b.

In an embodiment, each sinusoidal wheel 403 may be identified as "sinusoidal" as a result of their rim center 403d reciprocating back and forth on the wheel rotational axis 413 around the wheel rim 403b, as shown in FIG. 4B. In other words, the wheel rim 403b may execute/follow, or otherwise form, a continuous, sinusoidal curve/pattern around the perimeter 403j of the wheel hub 403a, wherein said continuous, sinusoidal curve has a sinusoidal frequency (thus executing a set amount of sinusoidal periods around the wheel hub 403a) and a sinusoidal amplitude. In essence, the rim center 403d may follow a sine curve having an amplitude (e.g., axial distance or displacement along wheel rotational axis 413), said amplitude having a maximum intensity/displacement and a minimum intensity/displacement that it smoothly transitions between as it continuously wraps around the circumference/outer perimeter 403j of the wheel hub 403a. The quantity of sinusoidal periods executed by the rim center 403d, and thus the wheel rim 403b may be any suitable whole number, such as 2 periods, such that the sinusoidal pattern is continuous and uninterrupted as it travels around the perimeter 403j of the rim 403b. As a result of each lateral edge 403e, 403f being equally offset from the rim center 403d, each lateral edge 403e, 403f may also follow a corresponding sinusoidal curve. It should be understood that sinusoidal curves of the lateral edges 403e, 403f may be "in phase" with the sinusoidal curve of the rim center 403d, such that the peaks (maximums) and troughs (minimums) of each sinusoidal curve are disposed on the same radial position on the sinusoidal wheel 403. Furthermore, the sinusoidal curves of the lateral edges 403e, 403f and rim center 403d of the rim 403 may be coaxially aligned on the wheel rotational axis, as seen in FIG. 4B.

The sinusoidal wheels 403 may provide several benefits when implemented within the herein disclosed caster assembly. The sinusoidal wheels 403 may experience less resistance to being rolled when compared to standard cylindrical wheels (e.g., wheels that do not have a rim center that executes/follows a sinusoidal pattern), which may be very helpful for maintaining the ability to roll the sinusoidal wheels 403 to move a supported structure, particularly for heavier supported structures that may require significantly more force to move. Additionally, the disclosed sinusoidal wheels 403 may be configured to pivot/change their travel direction more easily, as a result of the sinusoidally wheels 403 potentially "bending" in an intended travel direction, as described hereinabove. The shape of the sinusoidal wheel 403, and thus the resultant shape of the sinusoidal wheel rim 403b, may result in each sinusoidal wheel 403 experiencing less "scrubbing" or frictional resistance as each sinusoidal wheel 403 is pivoted, when compared to the shape of a traditional right circular cylindrical wheel having flat, planar rim edges. The utilization of sinusoidal wheels 403 within each herein disclosed caster assembly may also allow a user to change the direction a supported structure is moving by pivoting each caster with less force than would be required if standard cylindrical wheels were utilized for the caster assembly.

Figure 5:
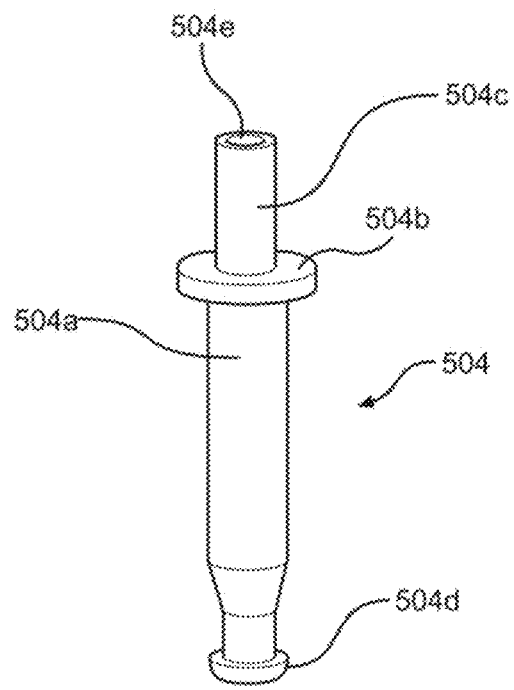
FIG. 5 illustrates the front perspective view of a pivot pin, according to an aspect.

FIG. 5 illustrates the front perspective view of a pivot pin 504, according to an aspect. As disclosed hereinabove, the pivot pin 504 may be configured to facilitate pivotal engagement between the top cap and the caster leg, such as top cap 101 and caster leg 102 of FIG. 1. The pivot pin 504 may comprise a pin body 504a, a support ring 504b disposed above and associated with the pin body 504a, a pin top 504c disposed above and associated with the support ring 504b and a rivet head 504d disposed below and associated with the pin body 504a. In an embodiment, the rivet head 504d and pin body 504a may be configured to nest within caster leg, whereas the pin top 504c may be configured to nest within the top cap, such that the top cap rests upon support ring 504b.

As can be seen in FIG. 5, the rivet head 504d and the support ring 504b may have a greater thickness (e.g. diameter) than the pin body 504a to facilitate secure engagement with the caster leg and supporting of the top cap, respectively. The thickness of the pin body 504a may narrow slightly as it approaches the rivet head 504d, in order to make it easier to nest the rivet head 504d within the corresponding port of the caster leg. The pin top 504c may have the same outer diameter as the pin body 504a, thus allowing said pin top 504c to be nested within the corresponding port of the top cap, as will be described in greater detail hereinbelow. In an embodiment, a pin slot 504e may be nested within the pin top 504c to improve engagement between the top cap and the pivot pin 504.

Figure 6:
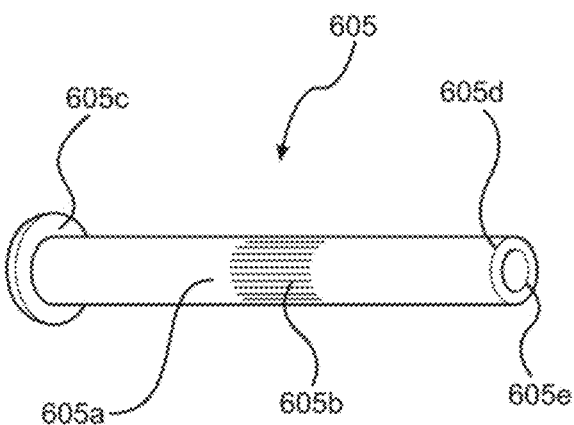
FIG. 6 illustrates the front perspective view of a wheel axle, according to an aspect.

FIG. 6 illustrates the front perspective view of a wheel axle 605, according to an aspect. As disclosed hereinabove, the wheel axle 605 may be configured to engage with the caster leg and rotationally engage with the sinusoidal wheels, such as caster leg 302 and sinusoidal wheels 303-1, 303-2 of FIG. 3. In order to facilitate this described rotation of the sinusoidal wheels, the wheel axle 605 may be configured to be nested within the wheel axle port of each sinusoidal wheel, such as wheel axle port 403c of FIG. 4C, as well as nested within the leg axle port of the caster leg, such as leg axle port 802d of caster leg 802 of FIG. 8B. It should be understood that wheel axle 605 may be configured such that upon being nested within each wheel axle port and nested within the leg axle port that each wheel axle port and the leg axle port may be coaxially aligned on the wheel rotational axis.

The wheel axle 605 may comprise an axle body 605a, a textured surface 605b disposed on the axle body 605a, an end cap 605c disposed on a first end of the axle body 605a and a leading end 605d disposed on a second end of the axle body 605a. In an embodiment, the wheel axle 605 may have a hollow center portion 605e nested within the axle body 605a to reduce its weight and use less material. The leading end 605d may be configured to slide through each of the corresponding wheel axle ports and the leg axle port to facilitate engagement of the wheel axle 605 with each sinusoidal wheel and the caster leg. The end cap 605c may have a diameter greater than that of the wheel axle ports and the leg axle port such that the end cap 605c itself is not configured to nest within any wheel or leg axle ports. Instead, the end cap 605c may be configured to prevent one of the sinusoidal wheels from sliding off of the wheel axle 605 upon being rotationally engaged with the caster leg, by virtue of the corresponding sinusoidal wheel being disposed between the caster leg and the end cap 605c. The other wheel may be secured to the wheel axle 605 through the utilization of an axle washer, such as axle washer 706 of FIG. 7, or another suitable axle capping structure, as will be described hereinbelow. As such, the leading end 605d may be disposed on the opposite side of the wheel axle 605 as the end cap 605c, thus preventing either wheel from disengaging with the wheel axle 605.

Figure 8A:
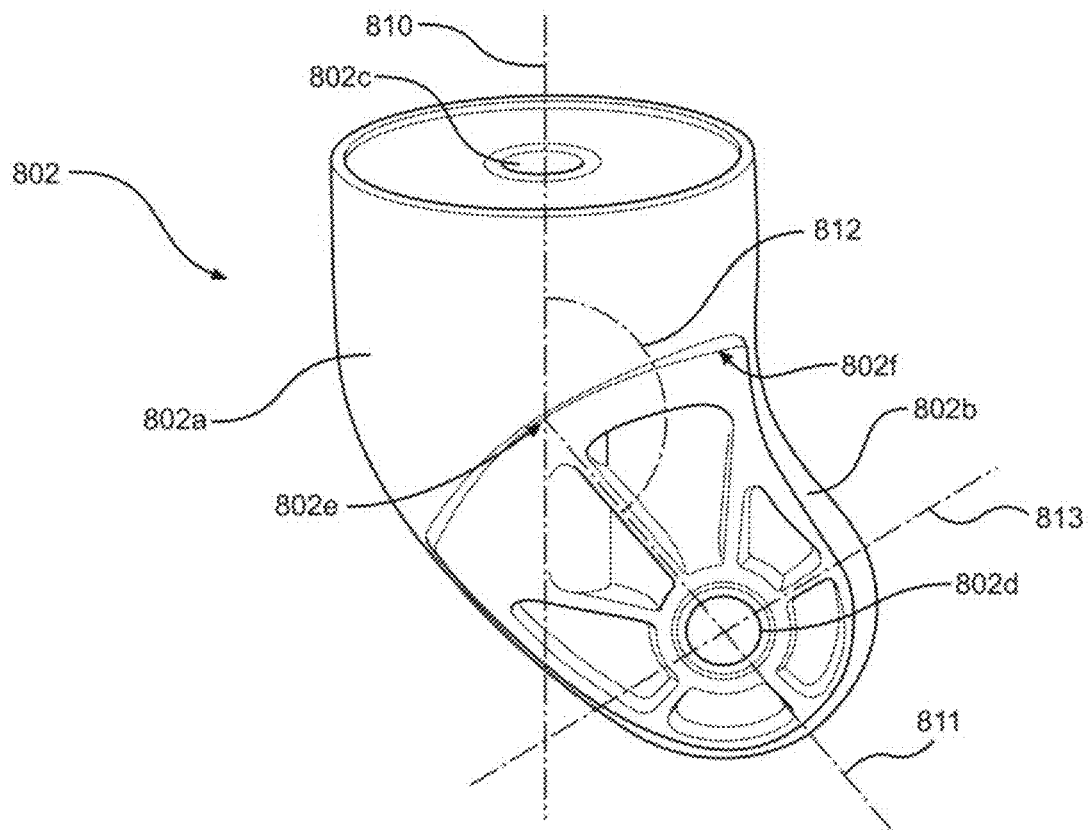
FIGS. 8A-8B illustrate the front perspective and bottom perspective views, respectively, of the caster leg, according to an aspect.
Figure 8B:
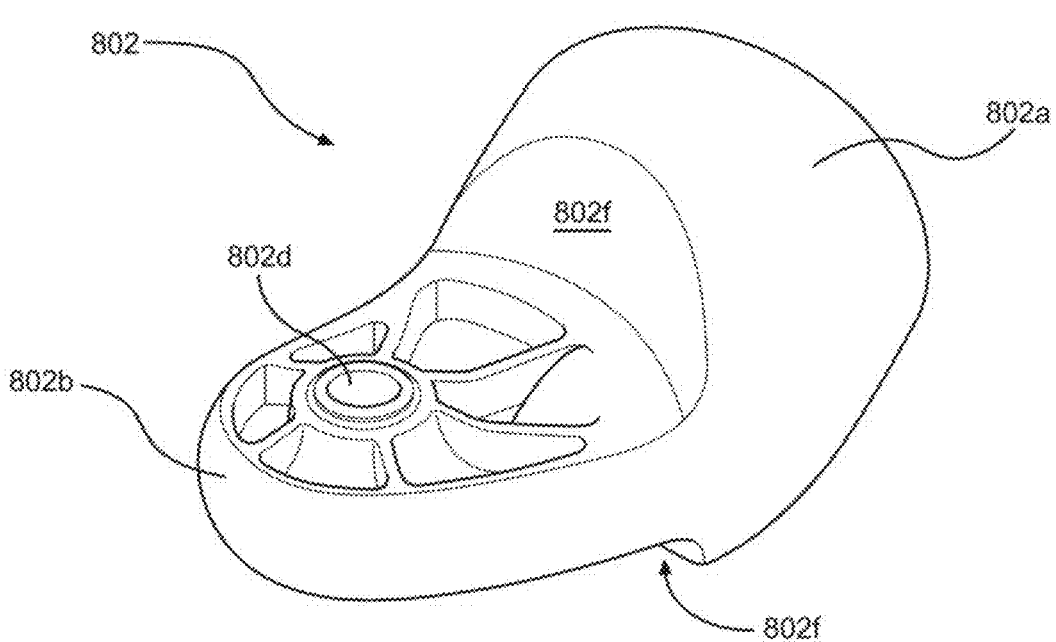

In an embodiment, the textured surface 605b of the wheel axle 605 may be disposed on a central portion of the axle body 605a, such that upon construction of the caster assembly via insertion of the wheel axle 605 through the corresponding axle ports, that the textured surface 605b is engaged directly with the leg axle port of the caster leg, such as leg axle port 802d of caster leg 802 of FIG. 8B. By securing the textured surface 605b of the wheel axle 605 to the caster leg, the wheel axle 605 itself may not rotate about its engagement with the caster leg, but the attached sinusoidal wheels may still be configured to rotate about their rotational engagement with the wheel axle 605, as intended. As such, the textured surface 605b of the axle 605 may itself function as a stopper, thus preventing the axle 605 from sliding out of the leg axle port, thus ensuring the sinusoidal wheels remain rotationally affixed to the axle 605. The axle body 605a may have a smooth, low friction finish, as well as a slightly lesser diameter than the wheel axle ports of each sinusoidal wheel, thus allowing each sinusoidal wheel to rotate freely about its engagement with the wheel axle 605 with minimal resistance, thus facilitating the smooth rolling of the sinusoidal wheels of the associated caster assembly.

In an embodiment, in order to maintain a more affordable price for the caster assembly, said wheel axle 605 may engage directly with the caster leg without the utilization of a corresponding wheel axle bearing (not shown). However, in alternative embodiments in which caster performance is to be optimized, it may be desirable to implement a wheel axle bearing within the structure of the caster assembly to enable smoother, lower friction rolling of the wheels. In an embodiment, a wheel axle bearing may be nested within the leg axle port of the caster leg, such as leg axle port 802d of FIGS. 8A-8B, wherein the wheel axle 605 would thusly be suitably engaged with said wheel axle bearing. Maintenance of the independent rolling of each sinusoidal wheel may be desirable to facilitate easy pivoting of the caster assembly, and thus each sinusoidal wheel may be configured to maintain rotational independence from the wheel axle 605, as well as the other sinusoidal wheel.

Figure 7:
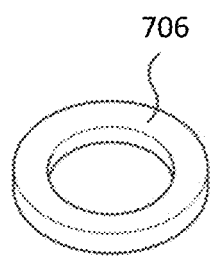
FIG. 7 illustrates the front perspective view of an axle washer, according to an aspect.

FIG. 7 illustrates the front perspective view of an axle washer 706, according to an aspect. In an embodiment, the axle washer 706 may have a shape roughly equivalent to that of a cylindrical ring. The axle washer 706 may be configured to engage with the traveling end of the wheel axle, such as leading end 605d of FIG. 6, such that one of the two sinusoidal wheels is confined between the axle washer 706 and the caster leg, upon engagement of each wheel with the wheel axle. It should be understood that the axle washer 706 may be nested between an axle cap (not shown) and the corresponding sinusoidal wheel, wherein said axle cap may be configured to engage with the traveling end of the wheel axle upon installation of the corresponding wheel, to help prevent corresponding sinusoidal wheel from falling off of the wheel axle and further prevent the wheel axle from sliding off of the caster assembly. In this way, the axle cap may function similarly to the end cap, such as the end cap 605c of FIG. 6, but for the opposite sinusoidal wheel of the pair.

In an embodiment, upon engagement of the wheel axle with the caster leg, the first sinusoidal wheel and the second sinusoidal wheel, such as wheel axle 305, caster leg 302, first sinusoidal wheel 303-1 and second sinusoidal wheel 303-2 of FIG. 3, the axle washer 706 may be configured to engage with a traveling end of the wheel axle, such as leading end 605d of FIG. 6. In such an embodiment, the first sinusoidal wheel may thusly be confined between the axle washer 706 and the caster leg, while being configured to rotate freely about the wheel rotational axis, whereas the second sinusoidal wheel may thusly be confined between the end cap of the wheel axle, such as end cap 605c of FIG. 6, and the caster leg while also being configured to rotate freely about the wheel rotational axis. The axle washer 706 may be configured to engage with the wheel axle through conventional engagement mechanisms, such as nesting around the wheel axle.

FIGS. 8A-8B illustrate the front perspective and bottom perspective views, respectively, of the caster leg 802, according to an aspect. The caster leg 802 may be configured to be pivotally engaged with the top cap and/or the supported structure through the utilization of a pivot pin, to facilitate pivoting of the attached sinusoidal wheels about their engagement to the supported structure, as disclosed hereinabove. The caster leg 802 may comprise a vertical member 802a, an angled member 802b attached to the vertical member 802a, a leg pin port 802c nested within the vertical member 802a, and a leg axle port 802d nested within the angled member 802b. As disclosed hereinabove, the leg pin port 802c may be configured to engage with the rivet head portion of a pivot pin, such as rivet head 504d of FIG. 5, whereas the leg axle port 802d may be configured to have a wheel axle, such as wheel axle 305 of FIG. 3, nested within it, wherein the wheel axle is coaxially aligned with the wheel rotational axis 813.

The vertical member 802a and the angled member 802b may be configured to adjoin at an engagement surface 802e, wherein the angled member 802b branches off from the vertical member 802a at an offset angle 812 defined between the pivot axis 810 of the caster leg 802 and the offset axis 811 of the angled member 802b. In an embodiment, the offset axis 811 may be defined by a straight line traveling between the engagement surface 802e and the leg axle port 802d, as seen in FIG. 8A. In an embodiment, a pair of wheel pockets 802f may be nested within the caster leg 802 to allow the sinusoidal wheels to be positioned beneath the vertical member 802a, without extending laterally away from the 810 pivot axis along the wheel rotational axis 813. In said embodiment, the pair of wheel pockets 802f may be utilized to define the engagement surface 802e between the vertical member 802a and the angled member 802b, wherein the engagement surface 802e is disposed between the wheel pockets 802f and the vertical member 802a. It should be understood that the wheel pockets 802f themselves may be nested within the angled member 802b, and thus may reduce the "thickness" of the angled member 802b (e.g., how far the angled member 802b extends along the wheel rotational axis 813.

It should be noted that while the offset angle 812 between the vertical member 802a and the angled member 802b (or more specifically, between the pivot axis 810 and the offset axis 811) may be adjusted based on the application of the associated caster assembly, such that the caster assembly may provide better performance (e.g., less frictional resistance to rolling and pivoting) when the offset angle 812 is maintained between a certain range of suitable offset angles 812. In an embodiment, the offset angle 812 may be an obtuse angle between 90 degrees and 180 degrees. In a preferred embodiment, the offset angle 812 may be between about 145 degrees and about 150 degrees. In a preferred embodiment, the offset angle 812 may be greater than 135 degrees but less than 180 degrees in order to ensure proper function of the caster assembly.

In an embodiment, having an offset angle 812 of less than 135 degrees may cause the attached sinusoidal wheels to tilt too far away from the pivot axis 810. This may negatively influence the smoothness of the ride for the caster assembly (e.g. the ease with which the sinusoidal wheels roll), as a result of how the force of the supported structure is exerted upon the sinusoidal wheels. It should be understood that the offset angle 812 may be selected based upon optimizing caster performance, including ease of rolling and ease of pivoting, with the disclosed sinusoidal wheels.

Figure 9A:
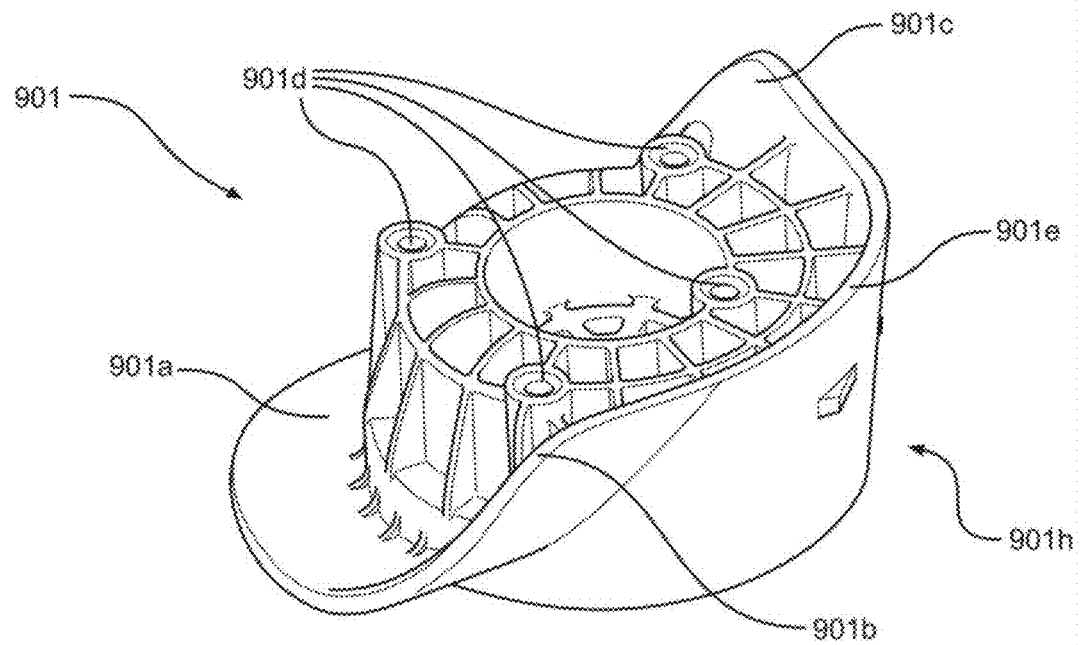
FIGS. 9A-9B illustrate the top perspective and the bottom perspective views, respectively, of a top cap, according to an aspect.
Figure 9B:
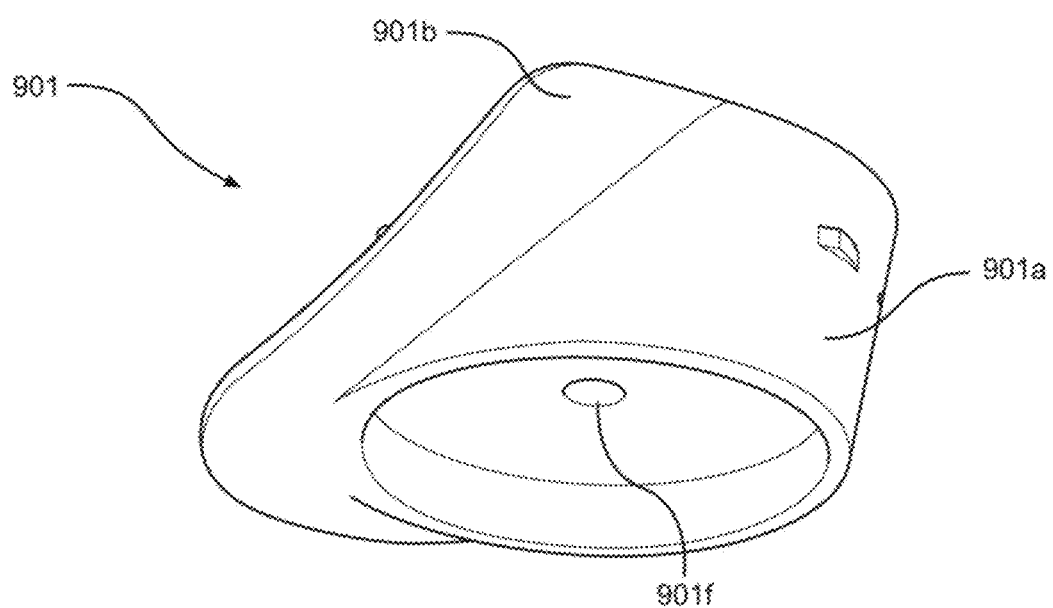

FIGS. 9A-9B illustrate the top perspective and bottom perspective views, respectively, of a top cap 901, according to an aspect. As disclosed hereinabove, the top cap 901 of the caster assembly may be configured to engage with a supported structure while being pivotally engaged with the caster leg through the utilization of a pivot pin, as shown in FIG. 3. The top cap 901 may comprise a cap body 901a having a first raised edge 901b and a second raised edge 901c. A raised rim 901e may be formed by the first and second raised edges 901b, 901c on the front end 901h of the top cap 901. A plurality of fastening pocket 901d may be nested within the cap body 901a to facilitate engagement between the supported structure and the top cap 901, as disclosed hereinabove. In an embodiment, the top cap 901 may be suitably shaped to securely engage with the supported structure, while maintaining a uniform appearance, as shown by suitcase 1319 of FIG. 13 engaging with the corresponding top cap.

In order to facilitate engagement with the pivot pin, such as pivot pin 504 of FIG. 5, a cap pin port 901f may be nested within or otherwise associated with the cap body 901a. As disclosed hereinabove, the top cap 901 may be configured to engage with the pivot pin such that the pin top of the pivot pin, such as pin top 504c of FIG. 5, may be configured to nest within the cap pin port 901f, whereas the cap body 901a may be configured to rest on top of the supporting ring of the pivot pin, such as supporting ring 504b of FIG. 5. It should be understood that the friction between the supporting ring and the cap body 901a may be minimized through the selection of suitable element materials, to ensure smooth and easy pivoting of the caster leg about its engagement with the top cap 901, as applicable.

With regards to the materials utilized for the herein disclosed caster assembly, it should be understood that strong, lightweight, durable materials, such as plastics and metals, may be utilized for the various components of the caster assembly, unless otherwise noted. In an embodiment, each element of the caster assembly may be made out of a high-strength metal, such as steel or aluminum, in order to provide the necessary structural integrity to the caster assemblies to allow them to support a heavy supported structure, such as a tool case, while allowing said supported structures to be rolled and the caster assemblies pivoted with ease. In an embodiment, the wheel rims, such as wheel rim 403b of FIGS. 4A-4B, may be made of a higher friction material, such as rubber, to allow the wheels to grip the floor more easily, to ensure the supported object does not slide unintentionally. In an alternative embodiment, the wheel rims 403b may be made of a lower friction material, such as a hard plastic to allow the wheels to pivot with less friction.

It should be understood that the wheel axle and pivot pin, such as wheel axle 305 and pivot pin 304 of FIG. 3, may be made out of a strong, lightweight material that is configured to allow for the pivotal/rotational engagement between adjoined elements, as outlined above, with minimal friction between them, such as a metal material having a smooth external texture. In an embodiment, element materials may be selected to minimize the friction between the wheel axle and sinusoidal wheels, to ensure that the sinusoidal wheels may easily roll in a direction to move a supported object across a floor. In an embodiment, element materials may be selected to minimize the friction between the pivot pin and the top cap and caster leg, such that the caster leg may pivot freely about its pivotal engagement with the top cap/supported structure, to facilitate smooth, easy pivoting of each caster assembly when a supported structure is pushed in changing directions.

Figure 10:
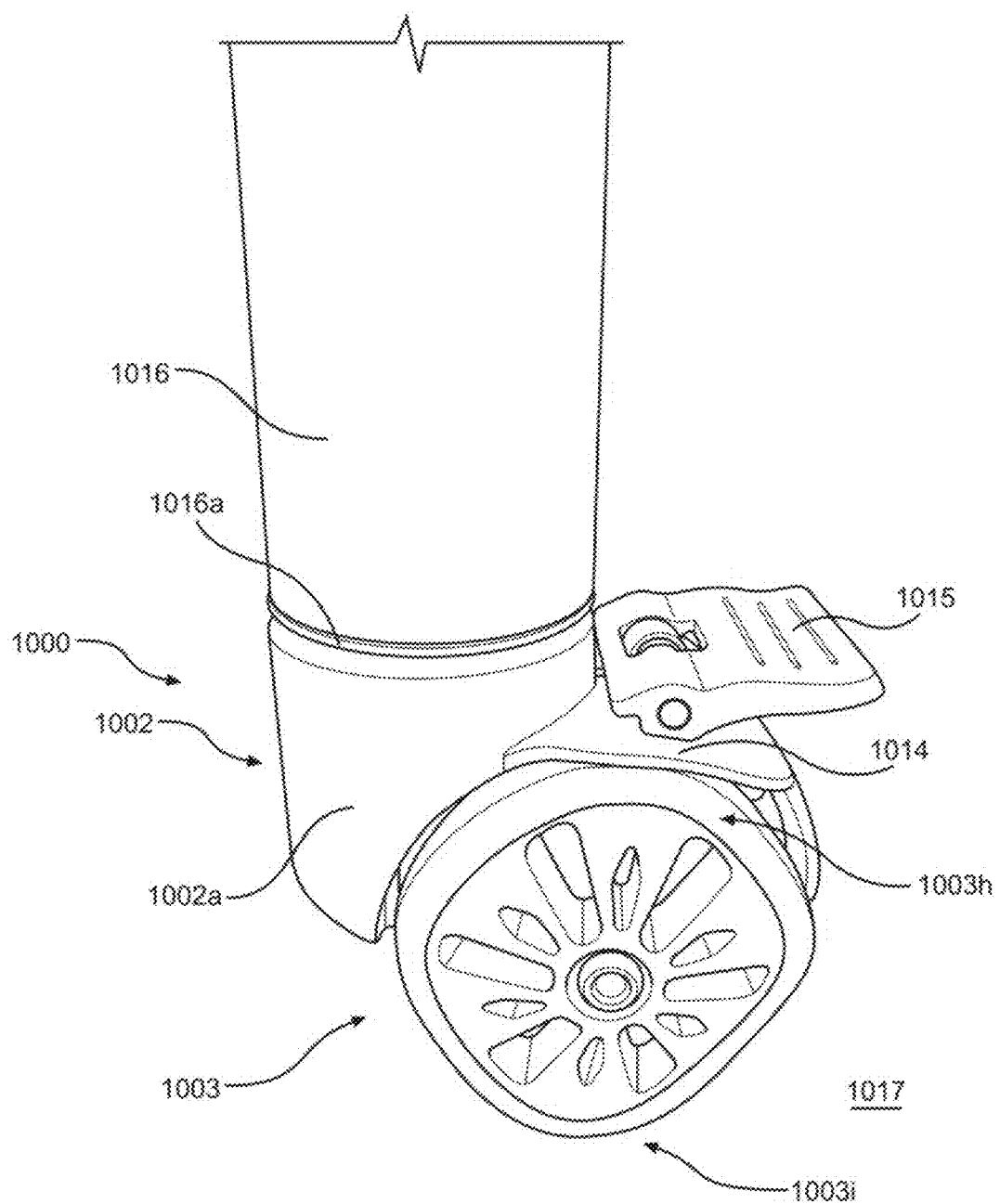
FIG. 10 illustrates the side perspective view of an alternative embodiment of the disclosed caster assembly secured to the leg of a structure, according to an aspect.

FIG. 10 illustrates the side perspective view of an alternative embodiment of the disclosed caster assembly 1000 secured to the leg 1016 of a structure, according to an aspect. As disclosed hereinabove, in order to facilitate the easy movement of a supported structure, one of the disclosed caster assemblies 1000 may be secured to a bottom portion 1016a of each of the supported structure's legs 1016. By providing a caster assembly 1000 between each leg 1016 and the ground 1017, the supported structure may be selectively moved with significantly less force than trying to drag or push the structure across the ground without caster assemblies 1000 beneath the legs 1016.

It should be understood that, in certain embodiments, the caster assembly 1000 may omit the top cap structure, such as top cap 101 of FIG. 1, while still pivotally engaging the caster leg 1002 with the supported structure using a corresponding pivot pin or pivot hub embodiment. In an embodiment, the caster leg 1002 may be configured to engage with the circular tubing/leg 1016 of the supported structure through the usage of a grip ring stem embodiment of the pivot pin, such as grip ring stem 1420 of FIG. 14, or a threaded stem embodiment of the pivot pin, such as threaded stem embodiment 1518 of FIG. 15. Regardless of the type of pivot pin or pivot hub utilized, as long as the caster leg 1002 is suitably configured to pivot about a direct or indirect engagement with the supported structure, any suitable pivot pin/pivot hub embodiment may be utilized.

The disclosed alternative embodiment of the caster assembly 1000 may also differ somewhat from the caster assembly embodiments disclosed hereinabove in FIG. 1-9B as a result of additional features. Two additional features, including the wheel cover 1014 and a wheel lock 1015 may be implemented into the alternative caster assembly 1000 of FIG. 10. It should be understood that elements of the prior disclosed caster assembly embodiments of FIG. 1-9B and the hereinbelow disclosed alternative caster assembly embodiments of FIG. 10-12 may be utilized together, such that the resultant caster assembly may achieve the desired combination of functional capabilities. For example, the hereinbelow described wheel cover 1014 may be implemented within the structure of caster assembly 100 of FIG. 1, if the corresponding functionality of said wheel cover 1014 (e.g., protecting the wheels) is desirable for an application or use-case.

In an embodiment, the caster leg 1002 of the caster assembly 1000 may further comprise a wheel cover 1014 associated with the vertical member 1002a of the caster leg 1002, wherein the wheel cover 1014 is configured to surround and protect a top portion 1003h of each sinusoidal wheel 1003. It should be understood that the top portion 1003h of each sinusoidal wheel 1003 may change as each sinusoidal wheel 1003 rolls, based on the current orientation of the sinusoidal wheel 1003. The bottom portion 1003i of each sinusoidal wheel 1003 may still be configured to contact the ground 1017, despite the presence of the wheel cover 1014.

In addition, the alternative caster assembly of FIG. 10 may further comprise a wheel lock 1015 associated with the caster leg 1002, or more specifically the wheel cover 1014, wherein the wheel lock 1015 is configured to selectively engage with the sinusoidal wheels 1003 of the caster assembly 1000 to prevent them from rolling. This wheel lock 1015 may facilitate the selective prevention of sinusoidal wheel 1003 rotation by directly contacting the sinusoidal wheels 1003 when actuated. A portion of the wheel lock 1015 configured to selectively contact the sinusoidal wheels 1003 may have a high coefficient of friction, such that said portion's selective contact with said sinusoidal wheels 1003 significantly increases the amount of force required to roll the sinusoidal wheels. As such, a user may choose to disengage the wheel lock 1015 on each caster assembly 1000 before moving a corresponding supported structure, and reengage the wheel lock 1015 of each caster assembly 1000 after moving the supported structure into the desired position, thus locking said supported structure in place.

Figure 11:
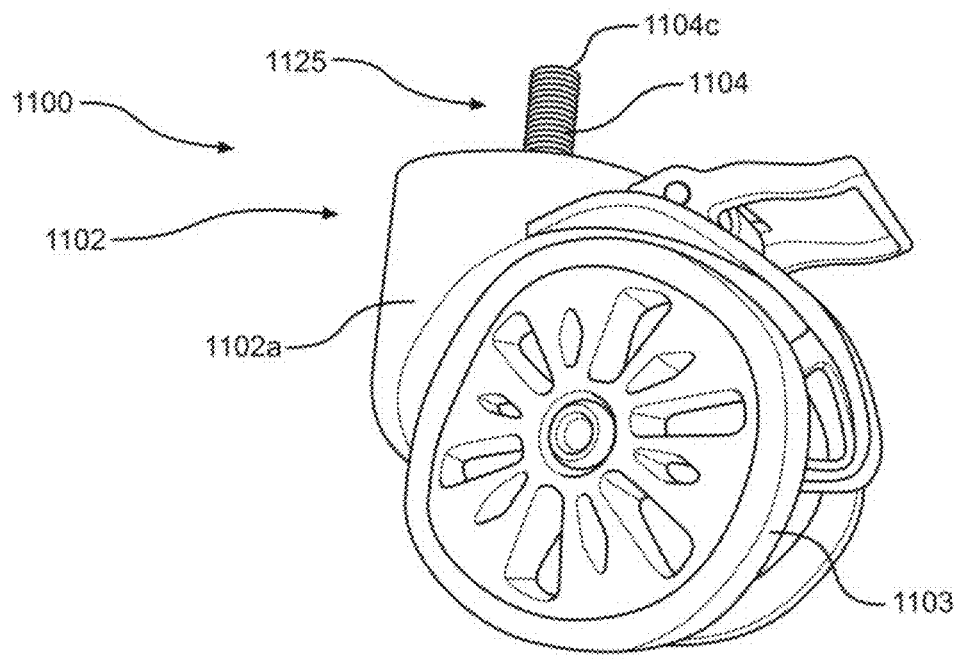
FIG. 11 illustrates the side perspective view of an alternative embodiment of the caster assembly without the top cap, according to an aspect.

FIG. 11 illustrates the side perspective view of an alternative embodiment of the caster assembly 1100 without the top cap, according to an aspect. It should be understood that multiple variations of each element of the caster assembly 1100 may be implemented as needed for a particular application of the caster assembly 1100. In an embodiment, the alternative caster assembly 1100 may utilize a threaded embodiment of the pivot pin 1104 having a pin top 1104c, wherein said pivot pin is configured to engage the caster leg 1102 directly with the supported structure. It should be understood that threads, or other known interconnection structures, may be utilized to interconnect the caster assembly elements to the supported structure as necessary, as long as the presence of said interconnection structures does not negatively impact caster functionality or performance. It should be understood that the pivotal engagement between the threaded pivot pin 1104 and the vertical member 1102a of the caster leg 1102 may be maintained to facilitate the necessary pivoting/swiveling action of the caster assembly 1100. It should also be understood that the alternative embodiments of the caster assembly 1100 may utilize sinusoidal wheels 1103 as well.

As disclosed hereinabove, the element of a caster assembly 1100 configured to facilitate the pivotal engagement of the caster leg 1102 with a supported structure may be a pivot pin 1104. As such, for the caster assembly 1100 embodiment of FIG. 11, the pivot hub 1125 may be just a pivot pin 1104, as the pivot pin 1104 is the structure responsible for pivotally engaging the caster leg 1102 with the supported structure.

Figure 12:
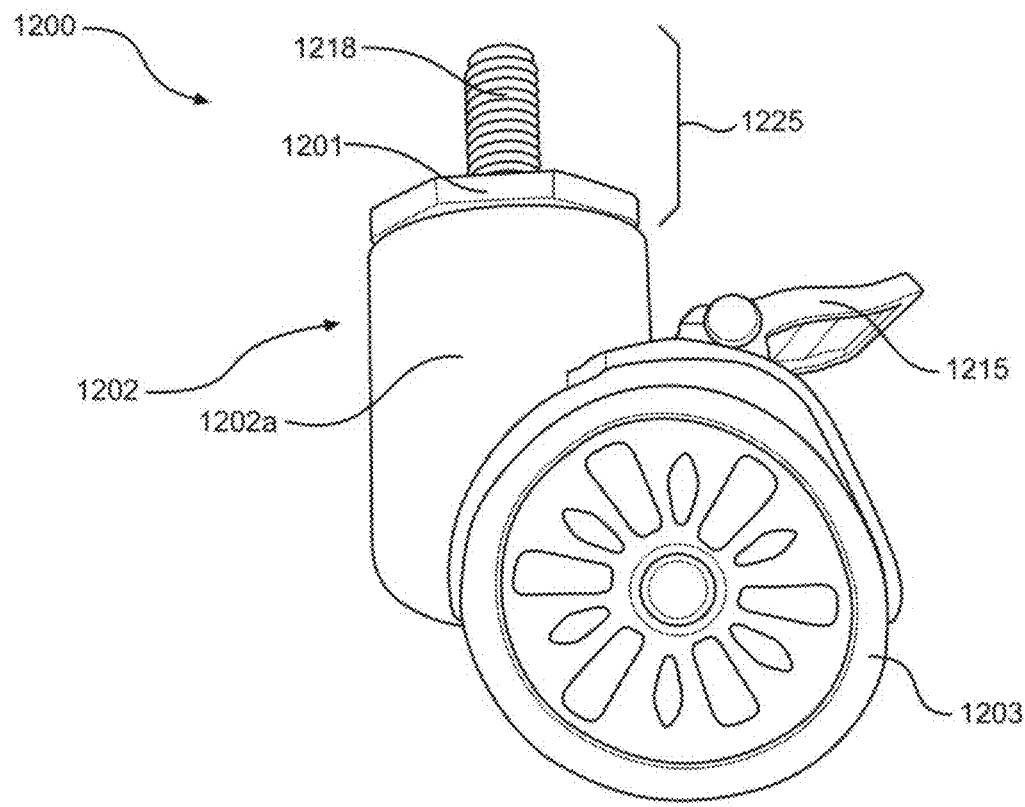
FIG. 12 illustrates the side perspective view of an alternative embodiment of the caster assembly having an octagonal top cap, according to an aspect.

FIG. 12 illustrates the side perspective view of an alternative embodiment of the caster assembly 1200 having an octagonal top cap 1201, according to an aspect. In an embodiment, the shape and characteristics of the top cap 1201 may be modified as necessary in order to achieve the necessary functional capabilities and appearance. As seen in FIG. 12, the top cap 1201 is configured to pivotally engage with the caster leg 1202 may have an octagonal shape (e.g. an octagonal cross section). This octagonally shaped top cap 1201 may be further engaged with a threaded stem 1218 embodiment of the pivot pin, wherein said threaded stem 1218 is configured to be engaged directly with the supported structure, such as leg 1016 of FIG. 10, such that the octagonal top cap 1201 is configured to be pivotally engaged with the supported structure, along with the attached caster leg 1202, and thus the attached sinusoidal wheels 1203, which are also configured to pivot about the pivotal engagement between the octagonal top cap 1201 and the supported structure.

The sizing of each element, such as the length, width, height, diameter, etc. of each element, may be modified as necessary depending on the desired wheel size, offset angle, weight of the supported structure, etc. In an embodiment, the length of the vertical member 1202a of FIG. 12 may be longer than the length of vertical member 1102a of FIG. 11. The height of the vertical member 1202a of a caster leg 1200 may be adjusted depending on a variety of factors, including the desired height of the supported structure. It may be preferable to have each caster assembly 1200 configured to attach to a specific supported structure having the same specifications to ensure that supported structure remains level and rolls evenly as it is pushed. In certain embodiments, it may be desirable to attach caster assemblies having different specifications or elements to different legs of a supported structure. For example, a structure having four legs may only need two out of the four caster assemblies to include wheel locks 1215, as the selective immobilization of the wheels 1203 two of the caster assemblies 1200 out of the four total caster assemblies may be sufficient to render a supported structure stationary as needed.

As disclosed hereinabove, the octagonal top cap 1201 may be configured to be fitted to tube-like elements such as the legs of furniture, tables, etc. In an embodiment, this fitting of the octagonal top cap 1201 to the tube-like element of the supported structure may increase the structural stability to the caster 1200. Furthermore, having the cross-sectional shapes of directly adjoining elements be similar allows the caster assembly 1200 to pivot as described without having an overly noticeable overhang between the differing geometries of the top cap 1201, the caster leg 1202 and the tube like element of the supported structure. For example, if an object having a square cross-section were rotated on top another object having a square cross-section, then there would be a noticeable overhang when the corner of one object was rotated to align with the middle of an edge for the other object. In contrast, for an object with an octagonal cross section, such as the octagonal top cap 1201, rotating on top of (or beneath) an object with a circular cross section, such as the vertical member 1202a of the caster leg 1202 or the leg of a supported structure, the overhang between these elements will not be nearly as noticeable, thus providing a more unified, clean appearance. For the disclosed caster assembly 1200 of FIG. 12, the pivot hub 1225 may comprise a threaded stem 1218 and an octagonal top cap 1201, wherein the octagonal top cap 1201 is configured to engage with the caster leg 1202 and the threaded stem 1218 and the threaded stem 1218 is configured to be pivotally engaged with the supported structure.

Figure 13:
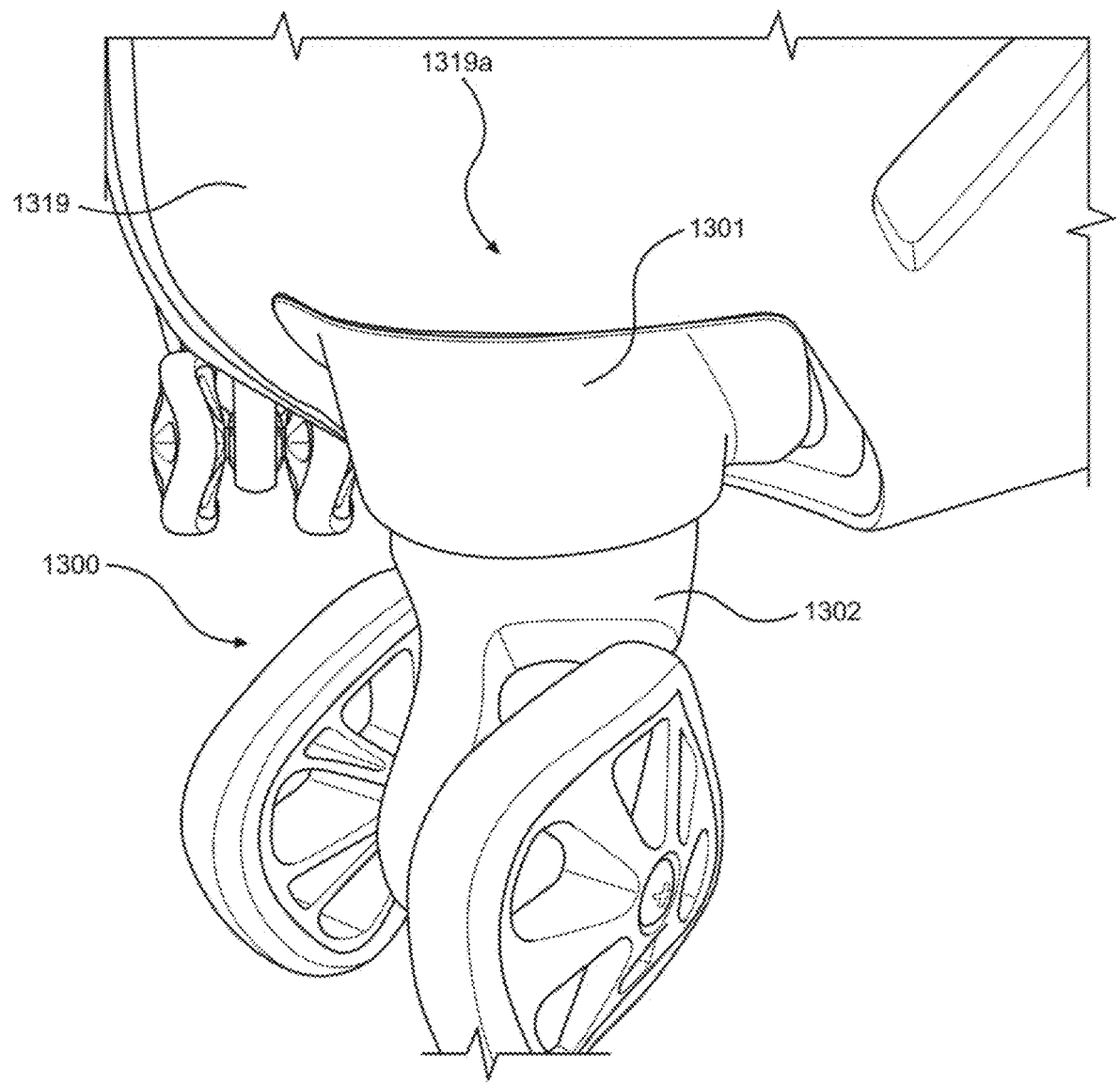
FIG. 13 illustrates the front perspective view of a caster assembly engaged with a suitcase, according to an aspect.

FIG. 13 illustrates the front perspective view of a caster assembly 1300 engaged with a suitcase 1319, according to an aspect. It should be understood that in order to facilitate secure engagement of the caster assembly 1300 with a supported structure or object, the top cap 1301 of the caster assembly 1300 may need to have a shape that is complementary to or otherwise compatible with the surface of the supported structure or object it is configured to engage with. In an embodiment, a caster assembly 1300 having a top cap 1301 equivalent to those seen in FIG. 1-9B may be configured to engage with a suitcase 1319, while conforming to the shape of the corner 1319a of said suitcase 1319. Other casters assemblies may also have top caps configured to have a shape that is complementary to the supported structure or object that they are being engaged with, or for certain embodiments, the top cap may be omitted, and the pivot pin or equivalent pivot hub may be configured to engage directly with the supported structure, while allowing the caster leg 1302 to be pivotally engaged with the supported structure.

Figure 14:
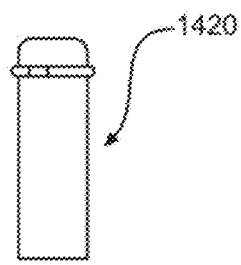
FIG. 14 illustrates a front elevation view of grip ring stem embodiment of the pivot pin, according to an aspect.
Figure 15:
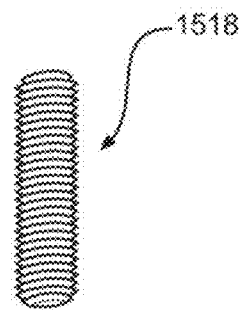
FIG. 15 illustrates a front elevation view of a threaded stem embodiment of the pivot pin, according to an aspect.

FIG. 14 illustrates a front elevation view of grip ring stem 1420 embodiment of the pivot pin, according to an aspect. FIG. 15 illustrates a front elevation view of a threaded stem embodiment 1518 of the pivot pin, according to an aspect. As mentioned hereinabove, various embodiments of the pivot pin may be utilized in order to facilitate the pivotal engagement of a caster assembly component with a supported structure. In embodiments lacking a top cap, an appropriate embodiment of the pivot pin, such as the grip stem 1420 of FIG. 14 or the threaded stem embodiment 1518 of FIG. 15, may be utilized to pivotally engage the caster leg of the caster assembly to the supported structure. In said embodiments, the pivot pin embodiment may be engaged with the caster leg and the supported structure, wherein the pivot pin is pivotally engaged with caster leg and/or the supported structure to facilitate the pivoting of the caster leg about the supported structure.

In embodiments having a top cap, such as caster assembly 300 of FIG. 3 and caster assembly 1200 of FIG. 12, the engagements made with the pivot pin embodiment may differ somewhat. As can be seen in FIG. 3, the pivot pin 304 may be configured to engage directly with the top cap 301 and the caster leg 302, wherein the top cap 301 was configured to be irrotationally engaged with the supported structure, such as suitcase 1319 of FIG. 13 and the pivot pin 304 is configured to be pivotally engaged with top cap 301 and/or the caster leg 302 to facilitate rotation of the caster leg 302 about the top cap 301. In contrast, as seen in FIG. 12, the threaded stem 1218 embodiment of the pivot pin may be engaged with the top cap and be configured to pivotally engage with the supported structures, such that the top cap 1201 rotates with the caster leg 1202 as the caster assembly 1200 is pivoted.

Figure 16:
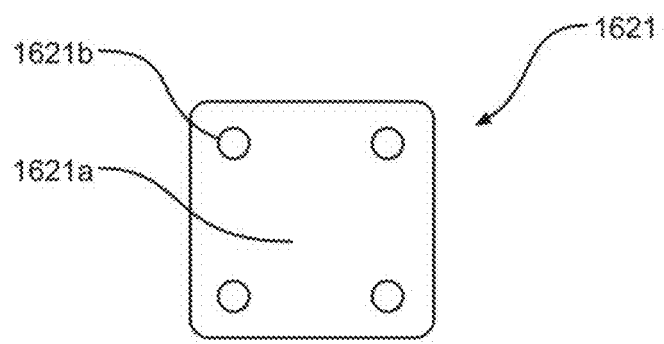
FIG. 16 illustrates the top plan view of a flat plate embodiment of the top cap, according to an aspect.

FIG. 16 illustrates the top plan view of a flat plate 1621 embodiment of the top cap, according to an aspect. The flat plate 1621 embodiment of the top cap may be desirable for supported structures having a flat bottom surface. The flat plate 1621 may comprise a plate body portion 1621a and a plurality of plate ports 1621b nested within the plate body portion 1621a. The flat plate 1621 may be configured to engage with a corresponding supported structure through the utilization of plurality of screws or other applicable fasteners, wherein said fasteners are configured to be nested within the plate ports 1621b and corresponding structures on the supported object, thus securing the flat plate 1621 to the supported structure. It should be understood that the flat plate 1621 may also be pivotally engaged with the caster leg through the utilization of a corresponding pivot pin, wherein the pivot pin is configured to engage with the flat plate 1621 and to pivotally engage with the caster leg, as seen in FIG. 18.

Figure 17A:
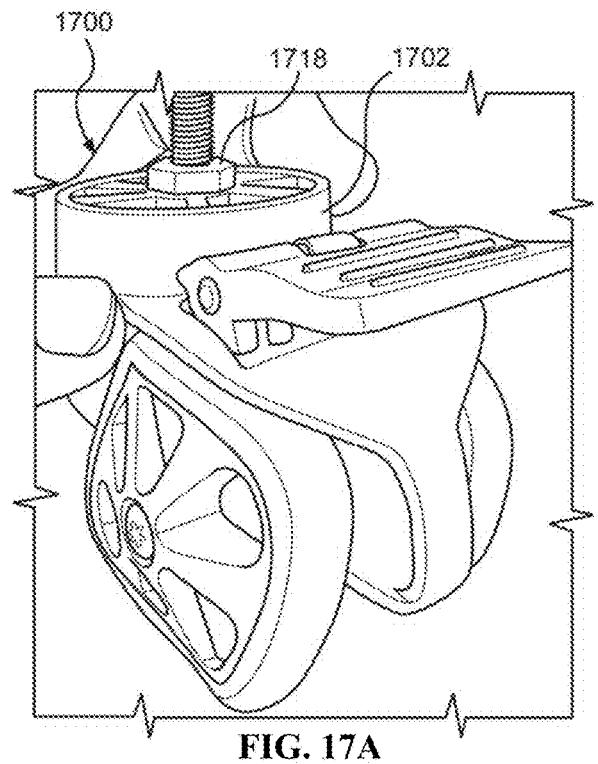
FIG. 17A-17B illustrate the rear perspective and top perspective views, respectively, of a caster assembly having a threaded stem, according to an aspect.
Figure 17B:
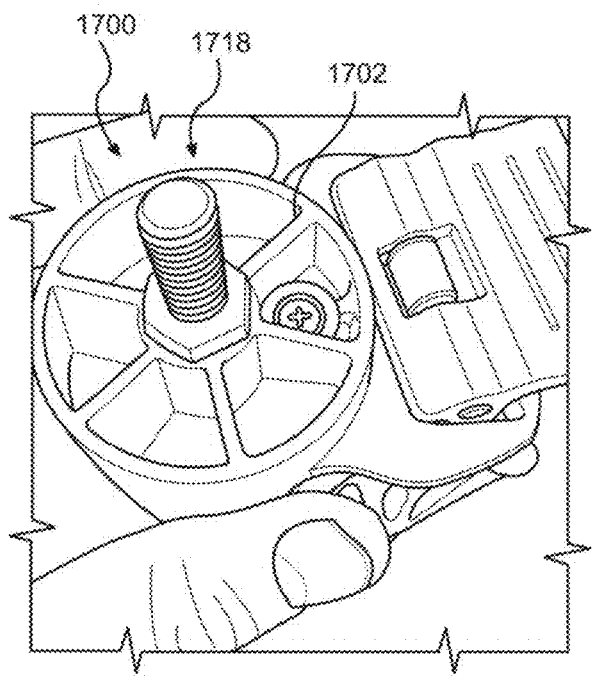

FIG. 17A-17B illustrate the rear perspective and top perspective views, respectively, of a caster assembly 1700 having a threaded stem 1718, according to an aspect. As disclosed hereinabove, in the absence of a top cap, a caster assembly 1700 may be configured to pivotally engage with a supported structure through the use of a pivot pin, such as a threaded stem 1718, acting as the entirety of the pivot hub. This pivot pin may be configured to pivotally engage the caster leg 1702 with a corresponding part of the supported structure that has a circular cross section, such that a unified appearance is established between the caster assembly 1700 and the supported structure.

Figure 18:
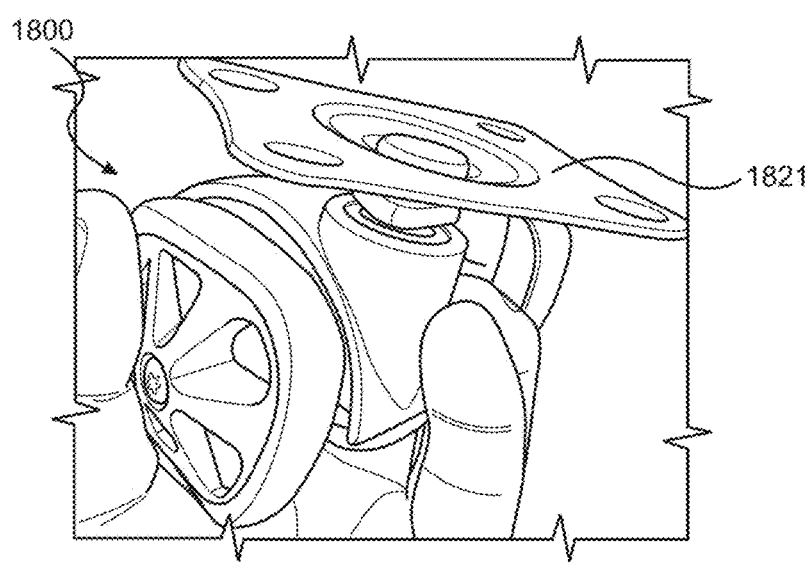
FIG. 18 illustrates the rear perspective view of a caster assembly having a flat plate, according to an aspect.

FIG. 18 illustrates the rear perspective view of a caster assembly having a flat plate 1821, according to an aspect. A caster assembly 1800 having a flat plate 1821 embodiment of the top cap may be configured to engage with a portion of the supported structure that has a similar cross-sectional shape. In an embodiment, for a leg of a supported structure having a square cross-sectional shape, the flat plate 1821 configured to engage with the leg of the supported structure may also have a square cross-sectional shape, as seen in FIG. 18.

It should be understood that the particular cross-sectional shape of the caster assembly element configured to engage and coaxially align with the supported structure may be adapted to be the same (or sufficiently similar to) the portion of the supported structure that it is configured to engage with. As seen in FIG. 10, a top cap assembly may be omitted from the corresponding caster assembly, such that the circular cross section of the vertical member 1002a of the caster assembly 1000 may coaxially align with a circular cross section leg 1016 of the support structure. For support structures having legs with a square cross section (not shown), the disclosed caster assembly 1800 of FIG. 18 may be desirable, wherein its square flat plate 1821 may be suitably sized and proportioned to coaxially align with the leg of the supported structure. Alternatively, a caster assembly having an octagonal cross section top cap, such as octagonal top cap 1201 of FIG. 12, may be configured to engage with support structure legs have octagonal, square or circular cross sectional-shapes, as said octagonally shaped top cap may be sufficiently close in shape to both square and circle cross section structures to still provide the desired appearance and performance.

Figure 19A:
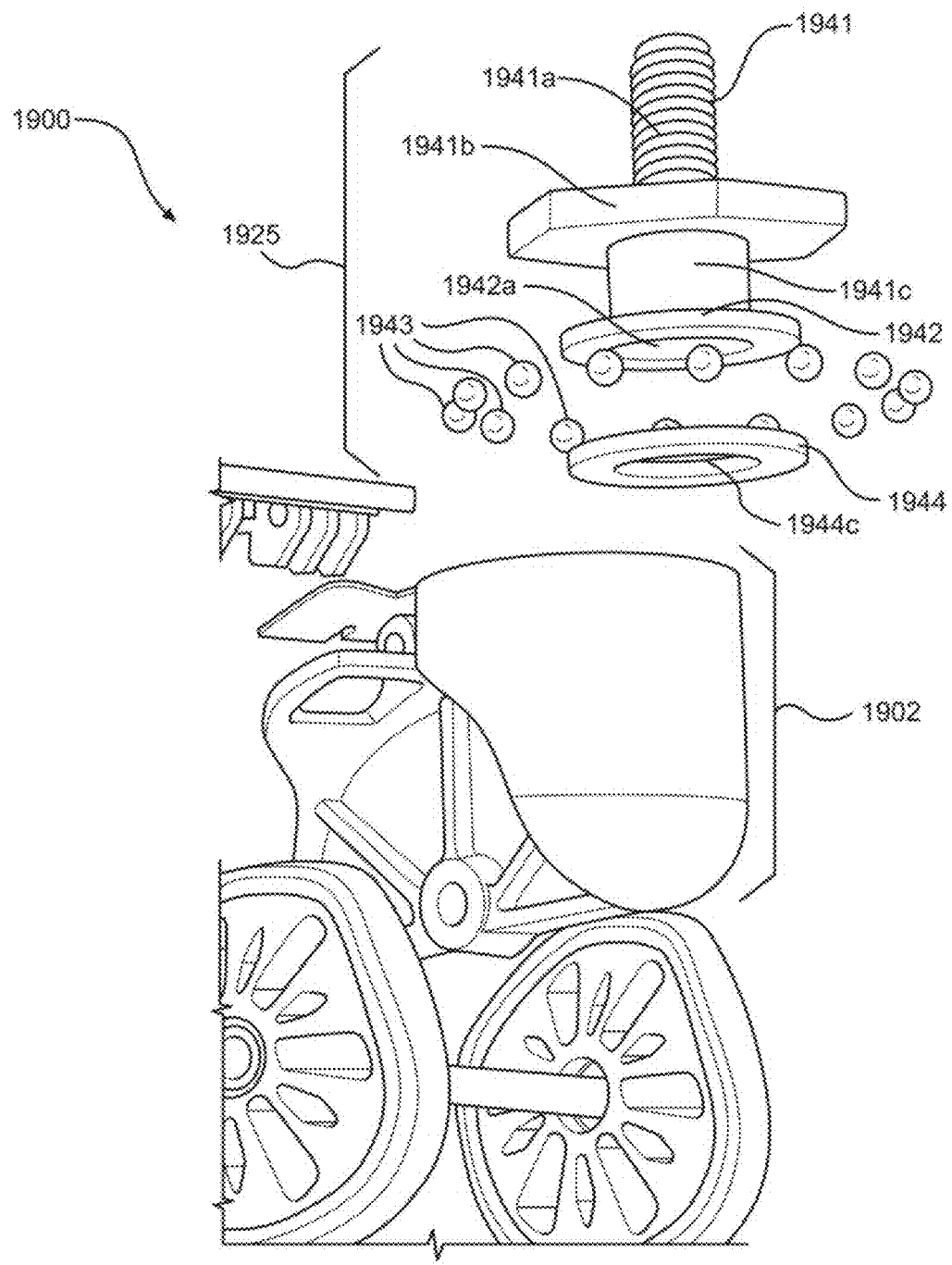
FIG. 19A illustrates an exploded side perspective view of a caster assembly having enhanced load bearing capabilities, according to an aspect.
Figure 19B:
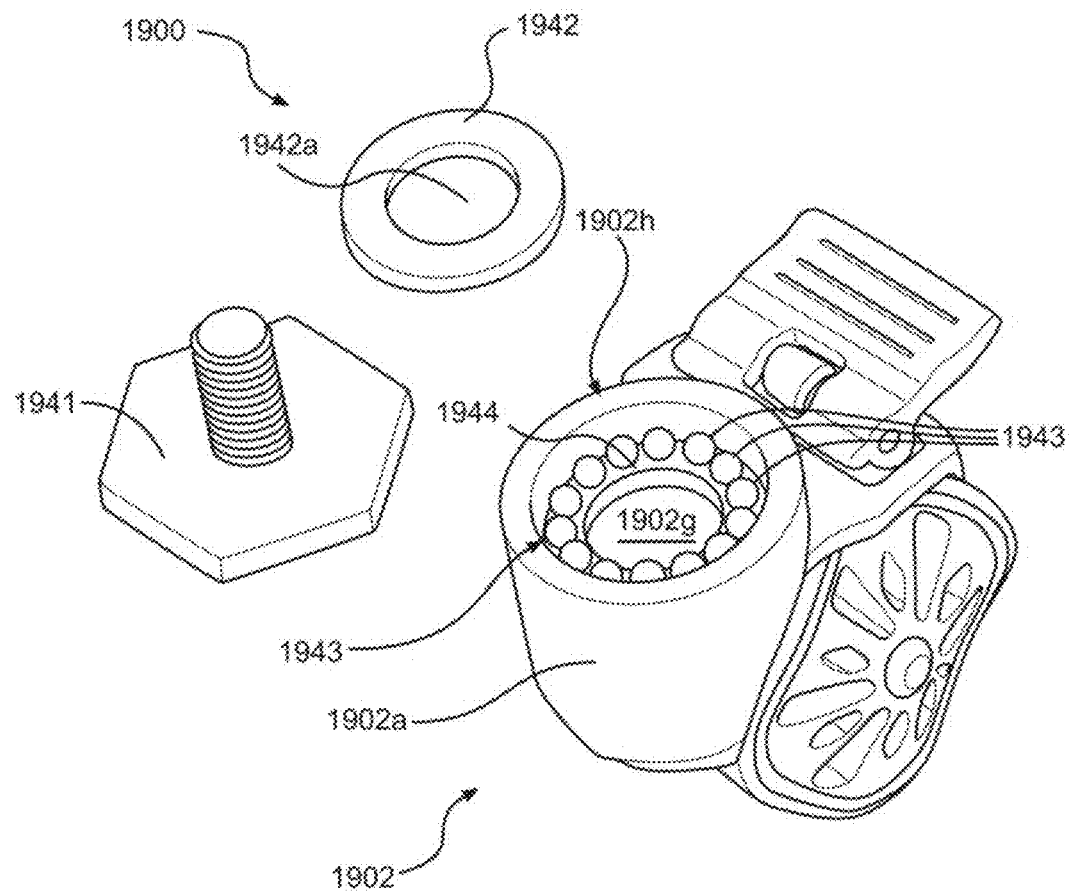
FIG. 19B illustrates an exploded top perspective view of a caster assembly having enhanced load bearing capabilities, according to an aspect.
Figure 19C:
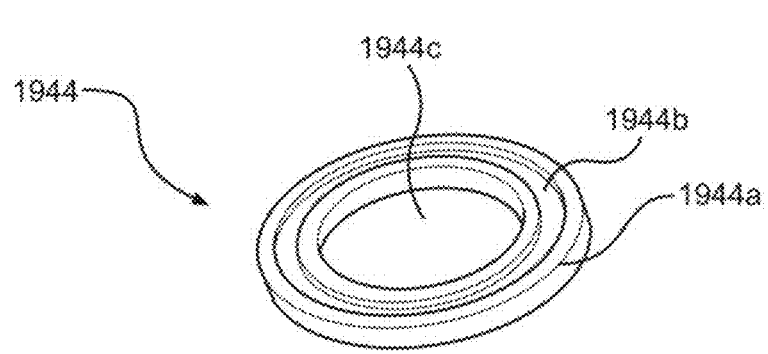
FIG. 19C illustrates a top perspective view of a retainer ring, according to an aspect.

FIG. 19A illustrates an exploded side perspective view of a caster assembly having enhanced load bearing capabilities, according to an aspect. FIG. 19B illustrates an exploded top perspective view of a caster assembly having enhanced load bearing capabilities, according to an aspect. FIG. 19C illustrates a top perspective view of a retainer ring 1944, according to an aspect. In order to enable the disclosed caster assembly 1900 to support a supported structure or object having a greater weight, a pivot hub 1925 configured to maintain the rotational capabilities of the caster assembly under said greater weight may be incorporated into the structure of the prior disclosed caster assemblies, such as caster assembly 1200 of FIG. 12. It should be understood that a caster assembly 1900 having this alternative pivot hub 1925 may be described as a "heavy load caster assembly" 1900, wherein the pivot hub 1925 itself may be described as a "heavy load pivot hub" 1925. In addition to utilizing alternative structures, caster assemblies may also be constructed of different materials to influence load capacity. In an embodiment, versions of the caster assembly 1900 having caster assembly components (e.g., wheel hubs, caster legs, etc.) made of plastic may be configured/rated to safely support 150 lbs per caster assembly, whereas versions of the caster assembly 1900 having caster assembly components made of aluminum may be configured/rated to safely support 250 lbs per caster assembly.

As can be seen in FIG. 19A-19C, the pivot hub 1925 may comprise a retainer ring 1944 configured to be nested within a caster leg cavity 1902g, wherein the caster leg cavity is nested or otherwise disposed within a top part 1902h of the vertical member 1902a of the caster leg 1902, the retainer ring 1944 having a retainer ring body 1944a and a bearing channel 1944b nested within retainer ring body 1944a, a plurality of ball bearings 1943 configured to be seated in the bearing channel 1944b of the retainer ring 1944, a pivot ring 1942 configured to be seated on top of, or otherwise engaged with, the plurality ball bearings 1943 and a pivot shaft ("pivot topper") 1941 configured to engage with a supported structure and rest upon pivot ring 1942. The pivot hub 1925 of FIG. 19 may be configured such that the caster leg 1902 may rotate freely about its indirect engagement with the pivot shaft 1941, by virtue of the pivot shaft 1941 being seated on top of, or otherwise engaged or associated with, a plurality of ball bearings 1943, wherein each ball bearing of the plurality of ball bearings 1943 is configured to roll freely within the bearing channel 1944b.

As can be seen in the embodiment of FIG. 19A, the pivot shaft 1941 may further comprise a plurality of elements combined into a monolithic structure. In an embodiment, the pivot shaft 1941 may further comprise a threaded rod 1941a, a pivot shaft nut 1941b engaged with and disposed below the threaded rod 1941a, and a pivot shaft base 1941c engaged with and disposed below the pivot shaft nut 1941b. In an embodiment, the threaded rod 1941a may be configured to be engaged with the supported structure, whereas the pivot shaft nut 1941b may be configured to be seated on or otherwise engaged with the pivot ring 1942, such that the supported structure is configured to be pivotally engaged with the caster leg 1902. In said embodiment, such as the caster assembly 1900 embodiment of FIG. 19D, the pivot ring 1942 and retainer ring 1944 may both be configured to surround the pivot shaft base 1941c, such that the pivot shaft base 1941c is nested within or otherwise surrounded by an empty central opening 1942a of the pivot ring 1942 and an empty central opening 1944c of the retainer ring 1944. The capability for the plurality of ball bearing 1943 to move within the bearing channel 1944b allows the pivot ring 1942, and thus the pivot shaft 1941 resting upon the pivot ring 1942, to be pivotally engaged with the caster leg 1902, such that the caster leg 1902 may pivot about the supported structure.

In an embodiment, the pivot shaft nut 1941b may have an octagonal shape/cross-section, similarly to the top cap 1201 of FIG. 12. In said embodiment, the pivot shaft nut 1941b may be sufficiently sized to cover the caster leg cavity 1902g disposed beneath it, such that debris and other materials may be kept out of the caster leg cavity 1902g to ensure proper pivotal engagement between the caster leg 1902 and the supported structure. This octagonal shape/cross-sectional shape of the pivot shaft nut 1941b may be configured to provide a uniform appearance for the caster leg as it pivots about the corresponding element of the supported structure, as disclosed hereinabove.

The particular configuration of the heavy load caster assembly 1900 of FIG. 19A-19B is such that the weight of the supported structure is exerted evenly across the plurality of ball bearings, thus ensuring that the heavy load caster assembly may evenly support greater weights 1900 without being damaged. In the disclosed caster assembly 1900, the weight of the supported load may be distributed over a greater surface area than if the pivot hub 1925 was engaged with the caster leg 1902 via a single rod or thread. In an embodiment, the caster leg 1902 may be irrotationally engaged with the retainer ring 1944 and the pivot shaft 1941 may be irrotationally engaged with the supported structure. As a result of the ball bearings 1943 being able to travel freely within the bearing channel 1944b, the pivot ring 1942 seated on top of the plurality of ball bearings 1943 may be configured to pivot about the pivot axis, such as pivot axis 2010 of FIG. 20, thus facilitating a pivotal engagement between the pivot shaft 1941 and retainer ring 1944. This in turn results in the pivotal engagement between the caster leg 1902 and the supported structure.

Figure 20A:
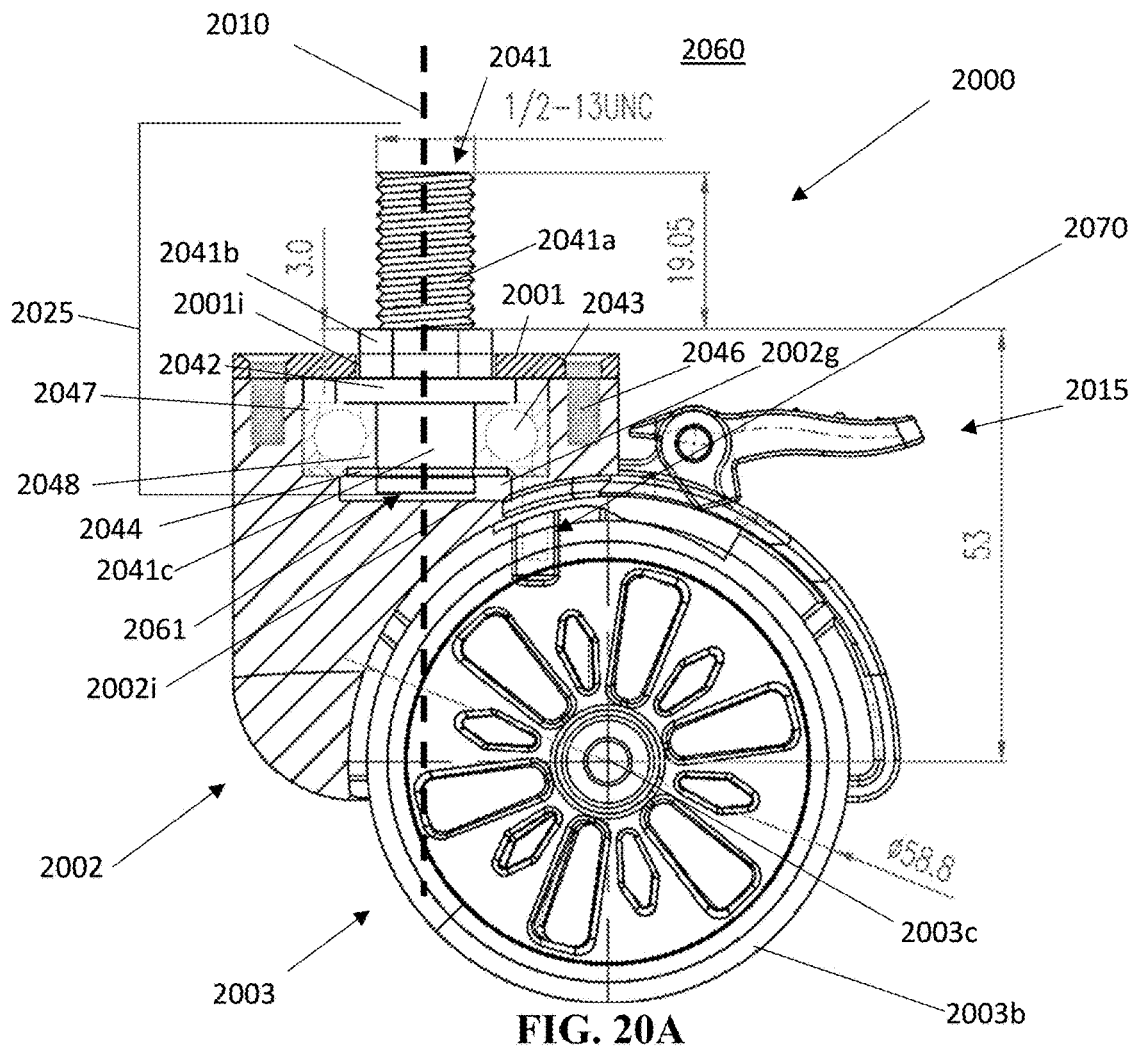
FIG. 20A illustrates the side elevation cross-sectional view of an alternative caster assembly having enhanced load bearing capabilities, according to an aspect.
Figure 20B:
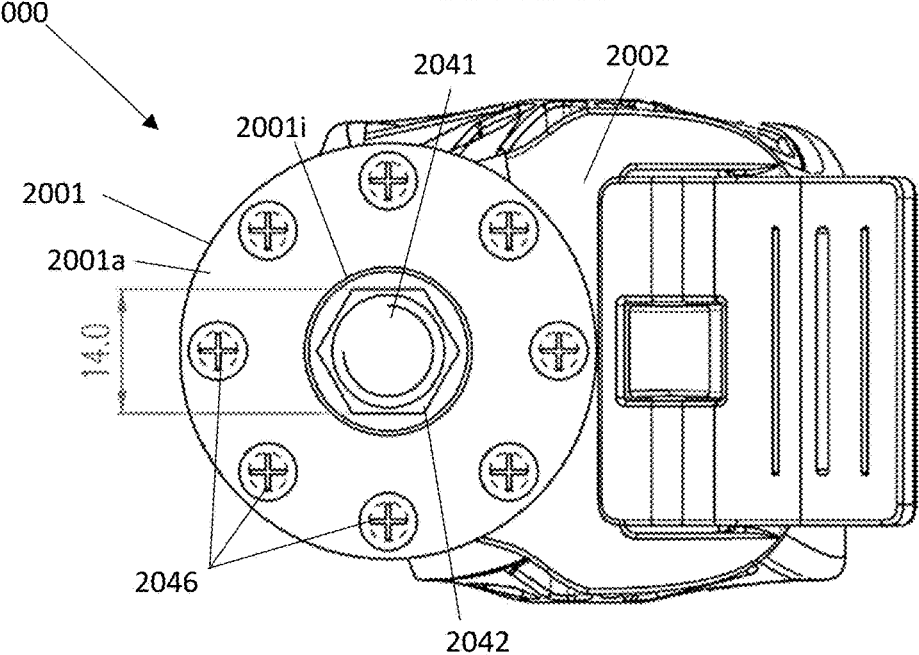
FIG. 20B illustrates the top plan view of an alternative caster assembly having enhanced load bearing capabilities, according to an aspect.

FIG. 20A illustrates the side elevation cross-sectional view of an alternative caster assembly 2000 having enhanced load bearing capabilities, according to an aspect. FIG. 20B illustrates the top plan view of an alternative caster assembly 2000 having enhanced load bearing capabilities, according to an aspect. As can be seen in FIG. 20A-20B, the structure of this alternative caster assembly 2000 may differ somewhat from the previously described heavy load caster assembly 1900 of FIG. 19A-19B. This being said, the alternative caster assembly 2000 of FIG. 20A-20B may utilize a similar heavy load pivot hub 2025, and thus may be classified as another type of heavy load caster assembly 2000.

The exact mechanism through which the plurality of ball bearings 2043 enable pivotal engagement between the caster leg 2002 and a supported structure may differ somewhat from the engagement mechanism described hereinabove in FIGS. 19A-19B. As can be seen in FIG. 20A, the pivot hub 2025 may further comprise of an inner gasket 2048 engaged with and surrounding the pivot shaft base 2041c of the pivot shaft 2041 and an outer gasket 2047 may be engaged with the caster leg 2002 and nested within the caster leg cavity 2002g. In an embodiment, the inner gasket 2048 may be disposed between the retainer ring 2044 and the pivot ring 2042. In contrast to the caster assembly 1900 embodiment of FIGS. 19A-19B, the plurality of ball bearings 2043 may be sandwiched/compressed or otherwise disposed between the inner gasket 2048 and the outer gasket 2047 to enable pivotal engagement between the pivot shaft 2041 (and thus the supported structure) and the caster leg 2002. In said embodiment of FIG. 20A, the retainer ring 2044 may not be utilized to directly seat the plurality of ball bearings 2043, but may instead be utilized to suitably seat the inner gasket 2048 engaged with the pivot shaft 2041 such that the inner gasket 2048 may be both coaxially aligned with, and the same elevation as, the outer gasket 2047 nested within the caster leg cavity 2002g.

Additional structures may also be utilized within the heavy load caster assembly 2000 of FIG. 20A-20B to ensure the desired look and performance for said caster assembly 2000. Atop cap 2001 may be engaged with the caster leg 2002 by a plurality of screws 2046 to provide a covering for the caster leg cavity 2002g. This top cap 2001 embodiment may have a cap body 2001a and a cap port 2001i nested within the cap body 2001a, wherein the cap port 2001i is configured to allow the pivot shaft 2041 to travel between the caster leg cavity 2002g and the external environment 2060, to facilitate pivotal engagement between the caster leg 2002 and the supported structure through said pivot shaft 2041. In an embodiment, the pivot shaft 2041 (including its threaded rod 2041a, pivot shaft nut 2041b and pivot shaft base 2041c), top cap 2001 (including its cap port 2001i), pivot ring 2042, retainer ring 2044, inner gasket 2048, outer gasket 2047 and caster leg cavity 2002g may be coaxially aligned on the pivot axis 2010. The plurality of ball bearings 2043 may be arranged into a circular pattern, as seen by ball bearings 1943 of FIG. 19B, in accordance with the circular ring shapes of the corresponding elements that engaged with them. In an embodiment, the top cap 2001 may be identified as a component of the pivot hub 2025.

In the embodiment of FIG. 19A-19B, the circular arrangement of the plurality of ball bearings 1943 is the result of the circular bearing channel 1944b. In the caster assembly 2000 of FIG. 20A-20B, the circular arrangement of the plurality of ball bearings 1943 is the result of the circular shape of the inner gasket 2048 (as a result of the inner gasket 2048 wrapping around the circular cross section of the pivot shaft base 2041c) and the circular shape of the outer gasket (as a result of the circular cross section of the caster leg cavity 2002g). Because of the circular shapes of the inner gasket 2048 and the outer gasket 2047, as well as their coaxial alignment and same elevation, the circular pattern formed by the plurality of ball bearings 2043 disposed between the inner and outer gaskets 2048, 2047 may be circular as well. As is understood, the circular shapes utilized for each corresponding structure of the pivot hub 2025 may allow for smooth pivoting of the caster leg 2002 about its engagement with a supported structure, even when the weight of the supported structure is significant. In an embodiment, the pivot shaft 2041 may not come into direct contact with the caster leg cavity (as seen by a small gap 2061 seen between the bottom of the pivot shaft base 2041c and the base 2002i of the caster leg cavity 2002g.)

It should be noted that the sizing specifications included herein are purely provided to illustrate a potential embodiment, rather than to limit the potential sizing specifications that may be utilized in alternative embodiments of the invention. In an embodiment, the outer diameter of the rim 2003b of each wheel 2003 may be about 58.8 mm. In said embodiment, the distance between the center of the wheel axle port 2003c and the top of the pivot shaft nut 2041b may be about 53 mm, wherein the top of the pivot shaft nut 2041b is about 3.0 mm tall, has a hexagonal shape, and an about 14.0 mm separation between the center of each hexagonal face and the corresponding opposing hexagonal face, as seen in FIG. 20B. The threaded rod 2041a may have height that extends the top of the pivot shaft nut 2041b by about 19.05 mm, wherein the threaded rod 2041a may have a ½"-13 UNC thread size. In an embodiment, a lock pin 2070 may be configured to engage with the wheel lock 2015 and the caster leg 2002 to secure the wheel lock 2015 to the caster leg 2002.

Figure 21:
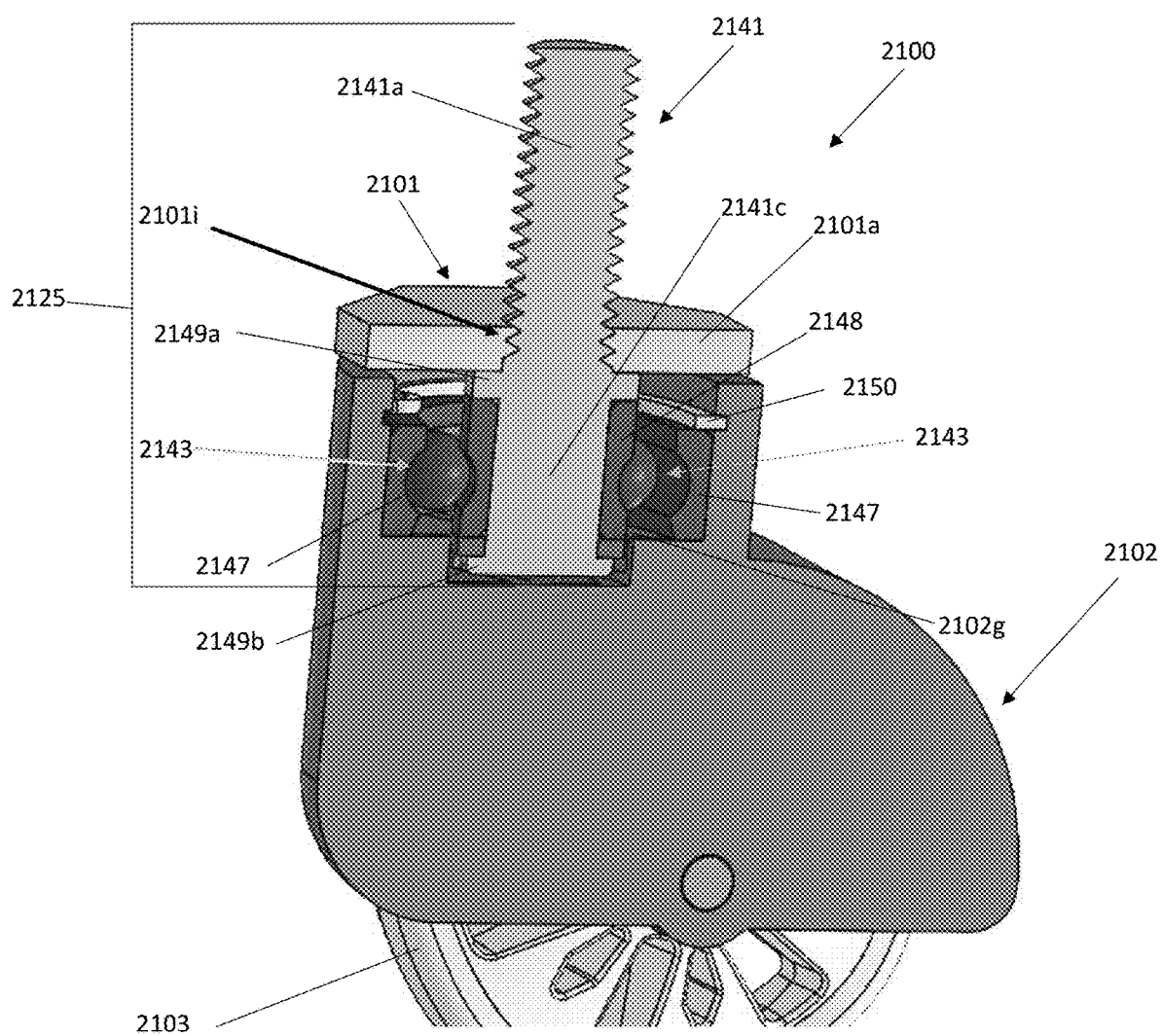
FIG. 21 illustrates a side perspective cross-sectional view of an alternative caster assembly having enhanced load bearing capabilities, according to an aspect.

FIG. 21 illustrates a side perspective cross-sectional view of an alternative caster assembly 2100 having enhanced load bearing capabilities, according to an aspect. As seen in FIG. 21, this alternative caster assembly 2100 embodiment may have several differences from the hereinabove described alternative caster assembly 2000 of FIG. 20A-20B. In the alternative caster assembly 2100 embodiment of FIG. 21, the pivot ring 2149a and base ring 2149b may be incorporated into the structure of the pivot shaft 2141, such that the threaded rod 2141a, pivot ring 2149a and base ring 2149b form a monolithic structure. Similarly to the caster assembly embodiment 2000 of FIG. 20A-20B, the inner gasket 2148 may be configured to surround the pivot shaft base 2141c and be nested between the pivot ring 2149a and base ring 2149b. In an embodiment, unlike the caster assembly embodiment 2000 of FIG. 20A-20B, the top cap 2101 may be directly engaged to the threaded rod 2141a, such that the top cap 2101 does not pivot with the caster leg 2102, but instead remains irrotationally affixed to the supported structure as the caster leg 2102 rotates around said top cap 2101 and the supported structure.

As can be seen in FIG. 21, the top cap 2101 may comprise a cap body 2101a and a threaded cap port 2101i nested within the cap body 2101a. The threaded rod 2141a of the pivot toper 2141 may be configured to engage with the threaded cap port 2101i such that the threaded rod 2141a is partially nested within the threaded cap port 2101i and extends above the top cap 2101, whereas the pivot shaft base 2141c is disposed below the top cap 2101. Aside from the disclosed difference regarding the engagement between the top cap 2101 and the pivot shaft 2141, the disclosed alternative caster assembly 2100 of FIG. 21 may be largely the same as the alternative caster assembly 2000 of FIGS. 20A-20B. The disclosed plurality of ball bearings 2143 may be configured to be compressed between the inner gasket 2148 and the outer gasket 2147 to facilitate the rotation of the caster leg 2102 about the pivot shaft 2141. In an embodiment, the inner gasket 2148 may be secured to the pivot shaft 2141 and the outer gasket may be secured to the caster leg 2002 in order to facilitate this pivotal engagement.

The plurality of ball bearings 2143 disposed between the inner gasket 2148 and the outer gasket 2147 may for a circular arrangement, wherein said circular arrangement is configured to be coaxially aligned with the inner gasket 2148, the outer gasket 2147 and the pivot shaft 2141.

In an embodiment, an outer gasket retaining ring 2150 may be configured to be nested within the caster leg cavity 2102g, as shown in FIG. 21. In said embodiment, the outer gasket retaining ring 2150 may be configured to further enable the smooth rotation of the caster leg 2102 about a supported structure by securely holding the outer gasket 2147 in place. By holding the outer gasket in place 2147, the plurality of ball bearing 2143 may also be held in place, as a result of being compressed between the secured outer gasket 2147 and the inner gasket 2148.

As disclosed hereinabove, the pivot hub 2125 may be configured to enable the pivotal engagement between the caster leg 2102 and a supported structure. While the exact rotational behavior of each element of the pivot hub 2125 may vary, each embodiment may allow the caster leg 2102 to swivel accordingly as the supported structure is moved. As is understood, the disclosed heavy load embodiments of the caster assembly 2100 may utilize the sinusoidal wheels 2103 described herein, such that the said caster assembly 2100 may be provided the corresponding advantages disclosed hereinabove.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A caster assembly comprising:
   a pivot hub configured to be engaged with a supported structure, the pivot hub comprising:
      a pivot shaft configured to be engaged with the supported structure, the pivot shaft comprising:
         a threaded rod configured to be engaged with the supported structure:
         a pivot shaft nut disposed below and engaged with the threaded rod; and
         a pivot shaft base disposed below and engaged with the pivot shaft nut; and
      a plurality of ball bearings configured to be engaged with the pivot shaft;
   a caster leg configured to be engaged with the pivot hub, such that the caster leg is pivotally engaged with the supported structure and configured to pivot about a pivot axis, the caster leg having:
      a vertical member configured to be coaxially aligned with the pivot axis;
      a caster leg cavity nested within the vertical member, wherein each ball bearing of the plurality of ball bearings is configured to be nested within the caster leg cavity; and
      an angled member associated with the vertical member, the angled member being coaxially aligned with an offset axis, wherein the angled member engages with the vertical member such that an offset angle is formed between the pivot axis and the offset axis;

a top cap associated with the caster leg, wherein the top cap is configured to cover the caster leg cavity;

a pair of sinusoidal wheels configured to be rotationally engaged with the angled member of the caster leg, such that each sinusoidal wheel of the pair of sinusoidal wheels is configured to rotate independently about a wheel rotational axis, each sinusoidal wheel of the pair of sinusoidal wheels having:

a wheel hub configured to be rotationally engaged with the angled member of the caster leg; and a rim configured to surround and be engaged with the wheel hub, the rim having:

a pair of lateral edges; and a rim center engaged with and equidistantly disposed between the pair of lateral edges;

wherein the rim center of each sinusoidal wheel of the pair of sinusoidal wheels follows a sinusoidal pattern around a circumference of the sinusoidal wheel, the sinusoidal pattern having a sinusoidal amplitude and sinusoidal frequency, wherein the rim center of each sinusoidal wheel of the pair of sinusoidal wheels is configured to be coaxially aligned with the wheel rotational axis and the pivot shaft is configured to be engaged with the plurality of ball bearings such that each ball bearing of the plurality of ball bearings is configured to roll in order to facilitate pivotal engagement between the caster leg and the pivot shaft.

2. The pivot shaft of claim 1 further comprising an inner gasket configured to be engaged with the pivot shaft and an outer gasket configured to be engaged with the caster leg, wherein each ball bearing of the plurality of ball bearings is disposed between the inner gasket and the outer gasket.

3. The caster assembly of claim 1 further comprising a wheel axle, wherein each sinusoidal wheel of the pair of sinusoidal wheels is configured to be rotationally engaged with the angled member of the caster leg by the wheel axle, the wheel axle being configured to be nested within the wheel hub of each sinusoidal wheel and the angled member, such that the wheel axle and each sinusoidal wheel of the pair of sinusoidal wheels are coaxially aligned on the wheel rotational axis.

4. The caster assembly of claim 1, wherein the offset angle is between about 145 degrees and about 150 degrees.

5. The caster assembly of claim 1, wherein the offset angle is configured such that the pivot axis does not intersect the wheel rotational axis.

6. The caster assembly of claim 1, wherein a separation distance between the pair of lateral edges of each rim is constant around the circumference of the corresponding rim.

7. The caster assembly of claim 1, further comprising a wheel lock configured to be engaged with the caster leg, wherein the wheel lock is further configured to be selectively engaged with the pair of sinusoidal wheels to prevent rotation of the pair of sinusoidal wheels about the wheel rotational axis.

* * * * *